US008010751B2

(12) United States Patent
Yang et al.

(10) Patent No.: US 8,010,751 B2
(45) Date of Patent: Aug. 30, 2011

(54) DATA FORWARDING ENGINE

(75) Inventors: Eric Kuo-Uei Yang, Los Altos, CA (US); Jun-Wen Tsong, San Jose, CA (US)

(73) Assignee: Bay Microsystems, San Jose, CA (US)

( * ) Notice: Subject to any disclaimer, the term of this patent is extended or adjusted under 35 U.S.C. 154(b) by 920 days.

(21) Appl. No.: 10/413,859

(22) Filed: Apr. 14, 2003

(65) Prior Publication Data

US 2003/0233503 A1  Dec. 18, 2003

Related U.S. Application Data

(60) Provisional application No. 60/372,746, filed on Apr. 14, 2002, provisional application No. 60/382,268, filed on May 20, 2002.

(51) Int. Cl.
*G06F 12/00* (2006.01)

(52) U.S. Cl. ......... 711/147; 711/151; 711/154; 711/158

(58) Field of Classification Search .................. 711/147, 711/151, 154, 158
See application file for complete search history.

(56) References Cited

U.S. PATENT DOCUMENTS

| | | | |
|---|---|---|---|
| 5,249,297 A * | 9/1993 | Brockmann et al. .......... 710/105 |
| 5,862,366 A | 1/1999 | Schmidt et al. | |
| 6,160,812 A | 12/2000 | Bauman et al. | |
| 6,259,699 B1 | 7/2001 | Opalka et al. | |
| 6,356,972 B1 * | 3/2002 | Chin et al. ..................... 710/310 |
| 6,449,631 B1 * | 9/2002 | Takamoto et al. ............ 709/200 |
| 6,477,166 B1 | 11/2002 | Sanzi et al. | |
| 6,542,959 B2 * | 4/2003 | Tabo ............................. 711/106 |
| 6,553,000 B1 | 4/2003 | Ganesh et al. | |
| 6,570,875 B1 | 5/2003 | Hegde | |
| 6,678,803 B2 * | 1/2004 | LaBerge ........................ 711/154 |
| 6,687,796 B1 * | 2/2004 | Laine et al. ................... 711/149 |
| 2003/0014591 A1 * | 1/2003 | Arimilli et al. ............... 711/122 |

OTHER PUBLICATIONS

Larry L. Peterson and Bruce S. Davie, Computer Networks, Copyright 2000, Second Edition, p. 251-258.*
International Search Report mailed on Oct. 6, 2003, for PCT patent application No. PCT/US03/11617 filed Apr. 14, 2003, 5 pages.

* cited by examiner

*Primary Examiner* — Midys Rojas

(57) ABSTRACT

A distributed multi-processor out-of-order system includes multiple processors, an arbiter, a data dispatcher, a memory controller, a storage unit, multiple memory access requests issued by the multiple processors, and multiple data units that provide the results of the multiple memory access requests. Each of the multiple memory access requests includes a tag that identifies the priority of the processor that issued the memory access request, a processor identification number that identifies the processor that issued the request, and a processor access sequence number that identifies the order that the particular one of the processors issued the request. Each of the data units also includes a tag that specifies the processor identification number, the processor access sequence number, and a data sequence number that identifies the order of the data units satisfying the corresponding one of the memory requests. Using the tags, a distributed arbiter and data dispatcher can execute the requests out-of-order, handle simultaneous memory requests, order the memory requests based on, for example, the priority, return the data units to the processor that requested it, and reassemble the data units.

3 Claims, 16 Drawing Sheets

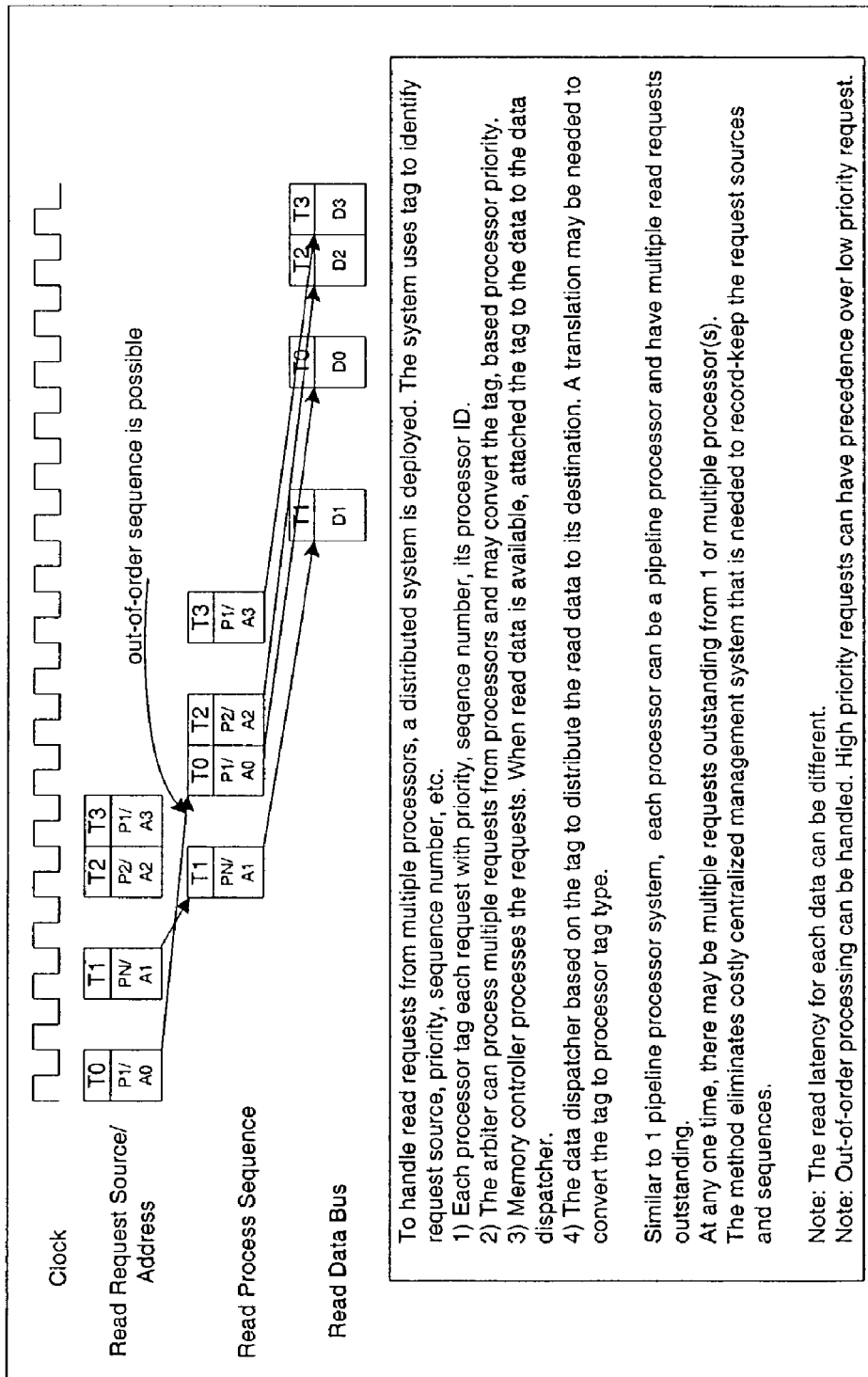

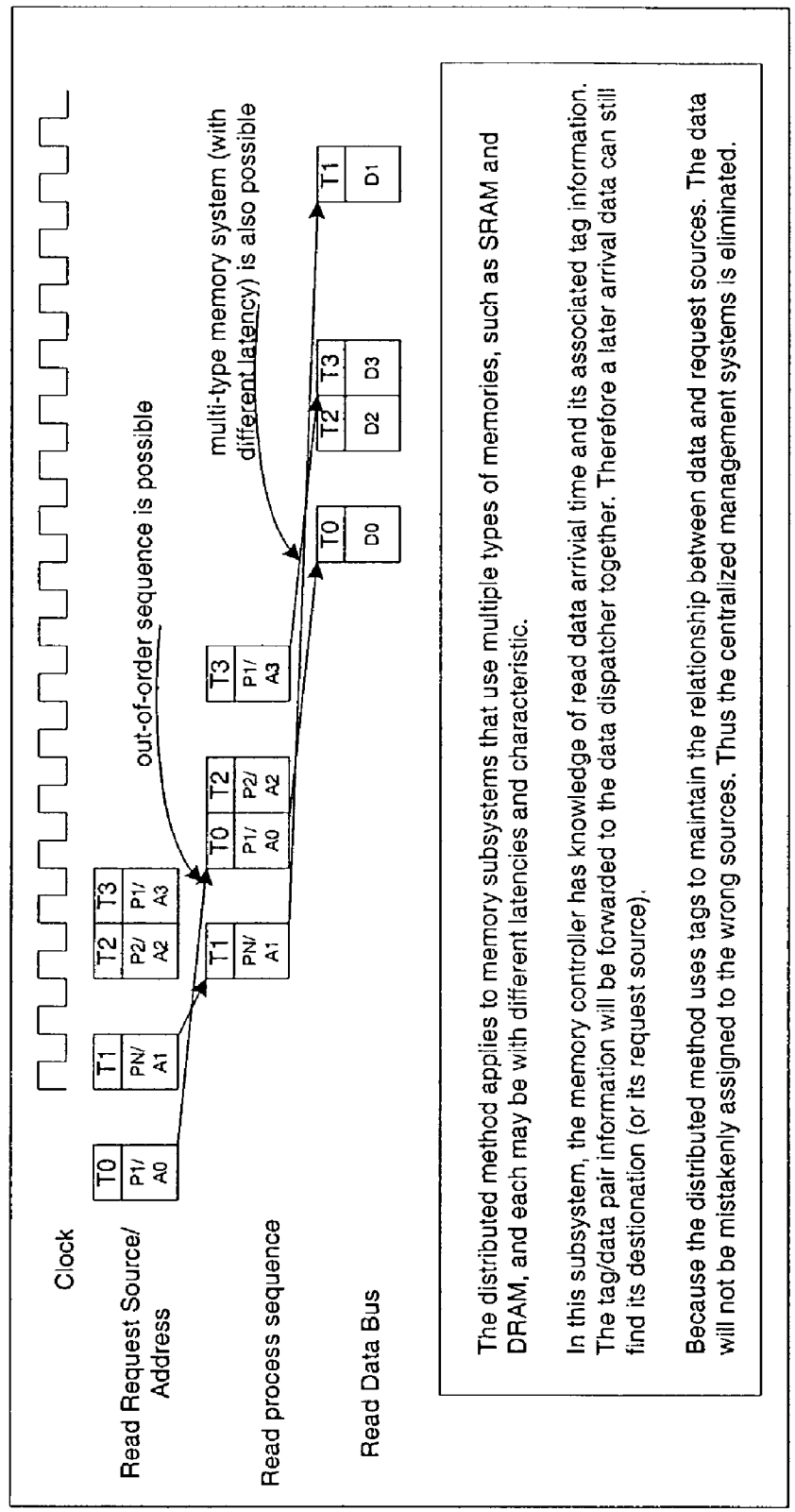

DATA FORWARDING ENGINE

CROSS-REFERENCE TO RELATED APPLICATION

This application claims priority of an earlier filed provisional applications U.S. Provisional Application Ser. No. 60/372,746, titled FORWARD PROCESSING UNIT filed Apr. 14, 2002, and U.S. Provisional Application Ser. No. 60/382,268, titled DATA FORWARDING ENGINE, filed May 20, 2002, both of which are incorporated herein by reference in their entirety.

BACKGROUND

1. Field of the Invention

The present application relates generally to a computer system and more particularly to a system that forwards data traffic.

2. Related Art

FIG. 1 shows a prior art single-processor system that includes a processor that issues memory access requests, a storage unit to store data, and a controller to interface with the storage unit. The processor provides the address within the storage unit from where the applicable data should be fetched (e.g., these addresses are represented by "A0", "A1", "A2", and "A3"). The controller returns the data fetched from the address within the storage unit (e.g., the data is represented by "D0", "D1", "D2", and "D3"). Even though the latency to access the storage unit varies depending on, for example, the level or memory type at which the data is stored (e.g., the data from address "A2" may be fetched much earlier than the data from address "A1"), the controller orders the sequence such that data is returned to the processor in the same order that the processor issued the memory access request (e.g., since "AO" was the first memory access request issued, then "D0" is the first data that's returned to the processor). This is done to ensure that each data finds its destination.

FIG. 2 shows a prior art multi-processor system that includes the multiple processors 1 to N, an arbiter, the controller, and the storage unit. Compared to the single-processor system, the multi-processor system allows processors to share data stored within the storage unit and better utilizes the storage unit. The arbiter processes multiple memory access requests from the multiple processors and maintains records of the processor making the request and the sequence that the memory access requests were issued, and when the data is available from the storage unit, the arbiter checks the records in order to dispatch the data to the processor that requested the data. The arbiter may also provide for out-of-order memory access request execution in which case the arbiter has to perform more record keeping in order to track the original order of the memory access requests so that the data can be provided to the appropriate processor in the correct order. Out-of-order execution means that the arbiter, for example, may schedule a second memory access request earlier due to its higher priority than a first memory access request even though the first memory access request was issued earlier by the processor.

This centralized arbiter is not scalable (e.g., this arbiter is application specific so if it's designed for a single-channel memory system then it cannot be used in a 2-channel memory system). In addition, the centralized arbiter scheme faces more challenges when it supports multi-channel subsystems. The single-channel memory system has only one memory space that can be accessed at any given time. The multi-channel memory system has multiple memory spaces and each of these multiple memory spaces are accessed independently of each other. Because the centralized arbiter faces both multiple request sources and multiple data channels (e.g., multiple memory channels), the centralized arbiter scheme is much more complex and may result in a large chip size and/or circuit timing penalty.

For the foregoing reasons, it is desirable to have a distributed multi-processor out-of-order execution to access a storage unit and forward data traffic.

SUMMARY

According to an embodiment of the present invention, a distributed multi-processor out-of-order system is disclosed. The system includes multiple processors, an arbiter, a data dispatcher, a memory controller, a storage unit, multiple memory access requests issued by the multiple processors, and multiple data units that provide the results of the multiple memory access requests. Each of the multiple memory access requests includes a tag that identifies the priority of the processor that issued the memory access request, a processor identification number that identifies the processor that issued the request, and a processor access sequence number that identifies the order that the particular one of the processors issued the request. Each of the data units also includes a tag that specifies the processor identification number, the processor access sequence number, and a data sequence number that identifies the order of the data units satisfying the corresponding one of the memory requests. Using the tags, a distributed arbiter and data dispatcher can execute the requests out-of-order, handle simultaneous memory requests, order the memory requests based on, for example, the priority, return the data units to the processor that requested it, and reassemble the data units.

Multiple data structures that together prevent blocking are also disclosed. The data structure is capable of absorbing parallel data streams sent from multiple data source units without losing any data or blocking the data. Each of the data structures have a number of entries that are greater than or equal to the number of data source units that can simultaneously send data to one of the multiple data structures. Arbiters and tags are used to store data in multiple memory units such that the data retrieved from these memory units are parallel to each other and have a large width.

Multiple processors are grouped together and incoming commands belonging to the same flow as a command executing on one of the processors of a group are sent to that same group of processors. The processors are grouped to limit the number of neighbor processors so that the cost of sharing state and link information is cheaper in terms of, for example, the time to access memory. Within the same group, there are wide communication channels that allow members of the group to communicate with each other.

Also disclosed is a head-of-line blocking prevention unit. Before sending forwarding information to a FPU pipeline engine, the head-of-line blocking prevention unit determines if there is adequate space in the first-in-first-out ("FIFO") of the physical input/output ("I/O") port to which the forwarding information is destined. If there is not adequate space in the FIFO to which this forwarding information is destined, then the forwarding information is not sent to the FPU pipeline engine.

A multicasting system is disclosed. This system includes a multicast unit that determines the subscribers that are to receive a portion or all of an information element of the multicast flow. For each of the subscribers, the starting point for the data that is to be sent is set to the beginning location of the multicast flow. A portion or all of the information element belonging to the multicast flow is then sent to each of the subscribers. In this way, the multicast flow is scheduled only once even though a portion or all of one of its information element is forwarded to multiple subscribers.

BRIEF DESCRIPTION OF THE FIGURES

FIG. 12 shows an exemplary table format for cell mode multicast.

FIG. 13 shows an exemplary table format for the packet mode.

FIG. 14 shows an exemplary multicast table format for CSIX mode.

FIG. 15 shows an exemplary forwarding instruction for cell mode.

FIG. 16 shows an exemplary forwarding state.

DETAILED DESCRIPTION

The following description sets forth numerous specific configurations, parameters, and the like. It should be recognized, however, that such description is not intended as a limitation on the scope of the present invention, but is instead provided to provide a better description of exemplary embodiments.

A forwarding processing unit ("FPU") is the data forwarding engine of a network processor. After, for example, a policy control unit ("PCU") completes storing the incoming information element into information segment storage units within a storage unit, a packet ready queue ("PRQ") command is issued. The information element is, for example, a packet or cell. The term information element is interchangeable with data. A flow, unless indicated otherwise herein, refers to a flow of information elements or a virtual channel, or any similar stream of information. Each PRQ command includes one flow identification ("flow-ID"), its buffer link information, and routing type. There are 3 routing types: (1) forward the data immediately ("bypass path"), (2) forward the data based on traffic processing unit ("TPU") scheduling ("TPU path"), and (3) forward the data based on data arrival sequence ("unassigned bit rate ("UBR") path").

Figure 1:
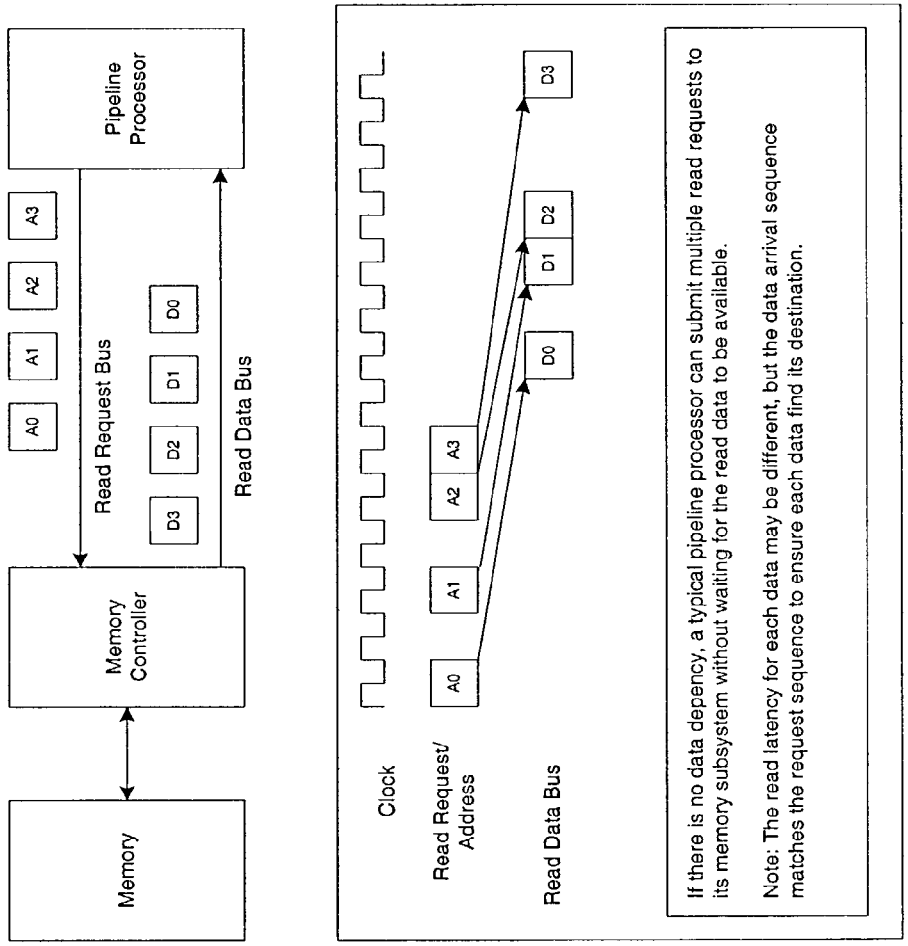
FIG. 1 shows a prior art single-processor system.
Figure 2:
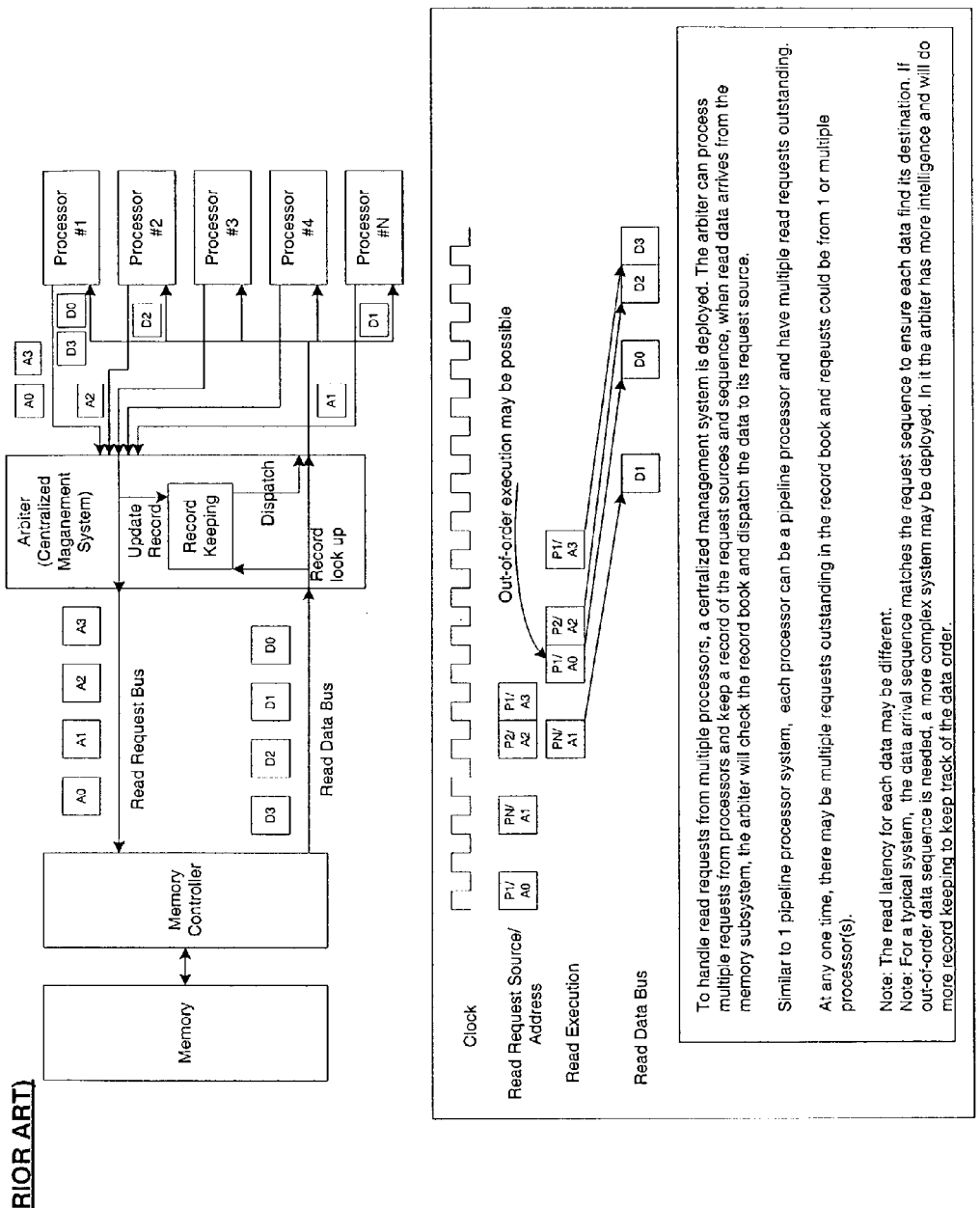
FIG. 2 shows a prior art multi-processor system
Figure 3:
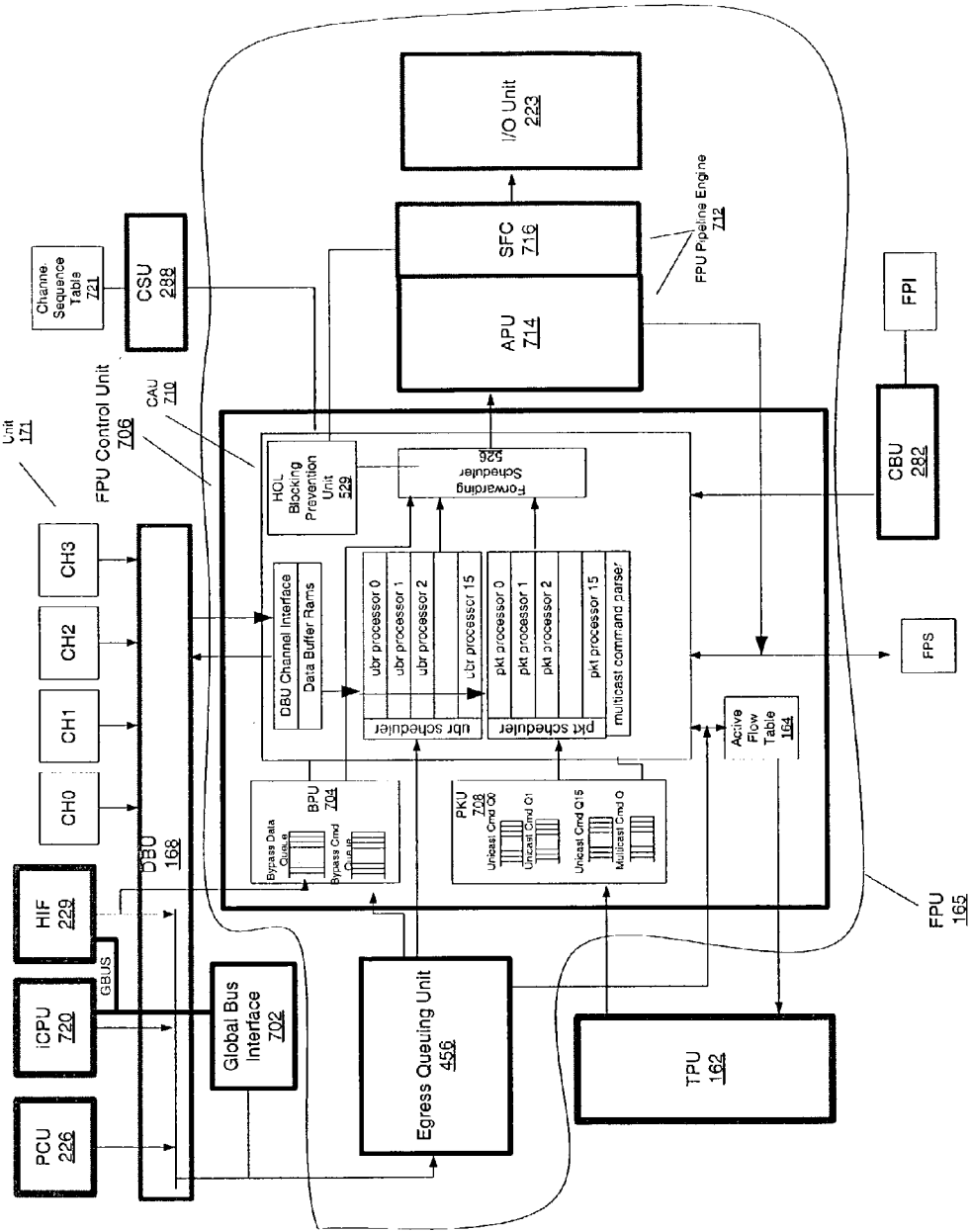
FIG. 3 shows an embodiment of the FPU according to the present invention.

FIG. 3 shows an embodiment of the FPU 165 according to the present invention. For the forward immediately type, this data skips traffic scheduling and is forwarded immediately ahead of all other unsent data by the FPU 165. The bypass path provides another processor a path to pass an information element to the line without having to be scheduled by a traffic processing unit ("TPU") 162. A host interface ("HIF") unit 229 is the interface between the network processor and another processor that is either on-chip or off-chip. The HIF unit 229 writes the information element to the "bypass data queue" and then sends the PRQ command, corresponding to the information element to be sent via the bypass path, to the egress queuing unit 456 using the global bus. The egress queuing unit 456 sends the command to the "bypass command queue". The PRQ command and the corresponding information element stored in the "bypass data queue" are sent to a forwarding scheduler 526 of a control access unit ("CAU") 710. The CAU 710 includes the forwarding scheduler 526, processors to process both UBR flows and TPU-scheduled flows, and the interface to the DBU 168. The forwarding scheduler 526 selects one of the data forwarding requests for outputting to a FPU pipeline engine 712. The forwarding scheduler 526 selects one of the data forwarding requests based on factors such as avoiding sending data to physical ports that are full and giving highest priority to bypass requests, the next highest priority to TPU scheduled requests, and the lowest priority to UBR requests. The FPU pipeline 712 includes an access processing unit ("APU") 714 which is a data flow pipeline machine that performs data output formatting and protocol translation. The FPU pipeline 712 also includes a switch fabric control ("SFC") unit 716 that performs tagging so that a switch fabric knows where to send the data. The SFC unit 716 sends the forwarding data to an input/output ("I/O") unit 223. The I/O unit 223 forwards data to the line or the switch fabric using one of the physical output ports of the network processor.

For the data forwarding based on the TPU 162 scheduling, after the PCU 226 completes storing the incoming information element into information segment storage units within a storage unit 171, the PCU 226 issues a packet ready queue ("PRQ") command which is fetched by the egress queuing unit 456. The egress queuing unit 456 updates an active flow table 164 with the information from the fetched PRQ command. Each entry of the active flow table corresponds to a flow supported by the network processor. Setting one of the entries may indicate that the corresponding flow is active, i.e., the flow has at least one information element segment stored in the storage unit 171 that is ready for forwarding. In addition, the egress queuing unit 456 updates a forward processing state ("FPS") from the information provided by the PRQ command so that the FPS has the most updated information. For example, the "current buffer pointer" field of the FPS is updated with the "first buffer pointer" field of the PRQ command at the time the first information element belonging to the flow arrives. In addition, the "last buffer pointer" field of the FPS 166 is updated with the "last buffer pointer" field of the PRQ command. The TPU 162, based on quality-of-service parameters, selects one of the flows for forwarding. The TPU 162 sends the flow-id for the selected flow and other information within a forwarding command to a packet command queue unit ("PKU") 708. If the selected flow is a unicast flow, then the forwarding command is sent to one of the unicast command queues that corresponds to the physical output port to which an information element of this flow are destined. If the selected flow is a multicast flow then it is sent to the multicast command queue. The PKU 708 sends the forwarding command to a "pkt scheduler". The "pkt scheduler" schedules the forwarding command to one of the processors that corresponds to the physical output port at which the flow associated with the forwarding command is to be sent. The processor fetches the FPS and a forward processing instruction ("FPI") corresponding to the selected flow using a control buffer unit ("CBU") 282. The processor then fetches, using the FPS, the contents of the one or more information segment storage units of the information element of the selected flow that is to be forwarded. The location of the one or more information segment storage units within the storage unit 171 that are to be retrieved is specified by the "current buffer pointer" field and the "current channel sequence number" field of the FPS. The CAU 710 uses a channel sequence table 721 that is accessed using a channel sequence table unit ("CSU") 288 to know the order in which the channels of the storage unit 171 are to be accessed in order to fetch the contents of the one or more information segment storage units. The request to retrieve the contents of the one or more information segment storage units is sent to a data buffer unit ("DBU") 168 using the "DBU channel interface". The DBU 168 interfaces with the storage unit 171. The contents of the one or more information segment storage units are sent to the requesting processor using the "DBU channel interface" and the "DBU buffer rams". Once the contents of the one or more information segment storage units are fetched, the processor sends a forwarding request to the forwarding scheduler 526. The forwarding scheduler 526 selects one of the data forwarding requests for outputting to a FPU pipeline engine 712.

For the data forwarding based on the UBR scheduling, the PCU 226 creates and maintains UBR chains. Each of the UBR chains is associated with one of the physical output ports. If the incoming information element belongs to a UBR flow, then the PCU 226 links the one or more information segment storage units belonging to the incoming information element to the appropriate one of the UBR chains belonging to the physical output port assigned to the UBR flow. After the PCU 226 completes storing the incoming information element into information segment storage units within the storage unit 171, the PCU 226 issues a packet ready queue ("PRQ") command which is fetched by the egress queuing unit 456. The egress queuing unit 456 updates a forward processing state ("FPS") from the information provided by the UBR PRQ command so that the FPS has the most updated information. The egress queuing unit 456 forwards this PRQ command to a "UBR scheduler". The "UBR scheduler" schedules the forwarding command to one of the processors that corresponds to the physical output port assigned to the UBR flow. The processor fetches the FPS and a forward processing instruction ("FPI") corresponding to the selected flow using a control buffer unit ("CBU") 282. The processor then fetches, using the FPS, the contents of the one or more information segment storage units of the information element of the selected flow that is to be forwarded. The location of the one or more information segment storage units within the storage unit 171 that are to be retrieved is specified by the "current buffer pointer" field and the "current channel sequence number" field of the FPS. The CAU 710 uses the channel sequence table 721 to determine the order in which the channels of the storage unit 171 are to be accessed in order to fetch the contents of the one or more information segment storage units. The request to retrieve the contents of the one or more information segment storage units is sent to the DBU 168 using the "DBU channel interface". The DBU 168 interfaces with the storage unit 171. The contents of the one or more information segment storage units are sent to the requesting UBR processor using the "DBU channel interface" and the "DBU buffer rams". Once the contents of the one or more information segment storage units are fetched, the UBR processor sends a forwarding request to the forwarding scheduler 526. The forwarding scheduler 526 selects one of the data forwarding requests for outputting to a FPU pipeline engine 712. Information elements within the UBR chain are sent out in the sequence of their arrival. The forwarding scheduler 526 give the UBR forwarding requests the lowest priority compared to bypass forwarding requests and TPU-scheduled forwarding requests.

For further information, see U.S. application Ser. No. 10/251,946, filed May 20, 2002, titled VERTICAL INSTRUCTION AND DATA PROCESSING IN A NETWORK PROCESSOR ARCHITECTURE; and U.S. application Ser. No. 10/035,571, filed Oct. 22, 2001, titled MEMORY MANAGEMENT SYSTEM AND ALGORITHM FOR NETWORK PROCESSOR ARCHITECTURE, and U.S. application Ser. No. 10/413,776, filed concurrently with this application on Apr. 14, 2003, titled NETWORK PROCESSOR ARCHITECTURE, all of which are incorporated by reference herein in their entirety.

Figure 4:
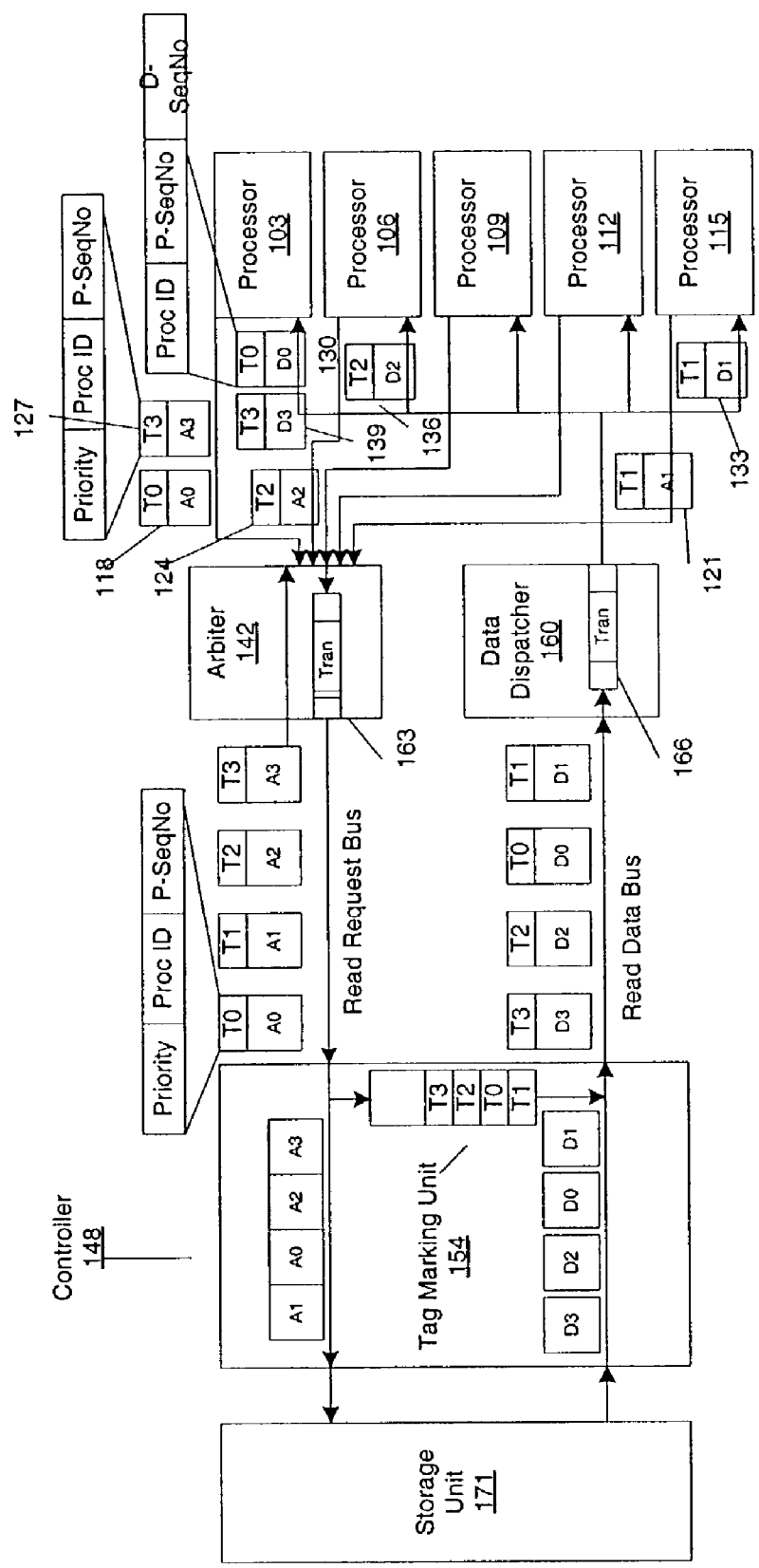
FIG. 4 shows a first embodiment of a distributed multi-processor out-of-order system according to the present invention.

By eliminating the centralized management system, the costly maintenance of maintaining, for example, which one of the processors issued a memory access request can be reduced or eliminated entirely. FIG. 4 shows a first embodiment of a distributed multi-processor out-of-order system according to the present invention. In this embodiment, processor 103 issues a memory access request (e.g., a read request) 118 and a memory access request 127. A processor 106 issues a memory access request 124, and a processor 115 issues a memory access request 121. Each processor can be a pipelined processor and have multiple memory access requests outstanding. Each of the memory access requests 118, 121, 124, and 127 includes a tag. The tag includes a priority, processor identification number ("proc ID"), and a processor access sequence number ("P-SeqNo"). The processor ID identifies the processor that issued the memory access request so that the data fetched due to the memory access request is sent to the processor that issued the request. The processor access sequence number indicates the order that the particular one of the processors issued the memory access requests. The processor access sequence number is used to support out-of-order execution so that the processor may reassemble the arriving data. The processor matches the memory access request with the arriving data to properly reassemble the data.

Within a storage unit 171, the data located at the address specified by the memory access request is returned to the processor issuing the request. Here, a data unit 130 and a data unit 139 are returned to the processor 103. A data unit 136 is returned to the processor 106. A data unit 133 is returned to the processor 115. Each of the data units also includes a tag. This tag includes the processor ID, the processor access sequence number and a data sequence number ("D-SeqNo"). The processor ID is used to identify the processor that requested the data, and the processor access sequence number is used to reassemble the arriving data units when out-of-order execution occurs. The data sequence number is used to reassemble the data that satisfies one memory access request. For example, one memory access request may produce multiple data units in the case that the information element is a packet and the data sequence number is used to reassemble the multiple data units that satisfy the single memory access request.

More particularly, when controller 148 accesses storage unit 171 over multiple cycles to process an access request, the data corresponding to the access request can be divided into multiple data units or data segments. Controller 148 tags the data units retrieved from storage unit 171 with data sequence numbers, which can be used by a processor to reassemble the data units. By tagging data units with data sequence numbers, controller 148 can access storage unit 171 without necessarily buffering and assembling the data units before sending the data units to data dispatcher 160. Thus, the amount of time needed to service an access request and the amount of hardware components within controller 148 can be reduced, and the utilization of storage unit 171 can be increased.

For example, storage unit 171 can include multiple banks with constraints on how the banks can be accessed. These constraints can result in delays in retrieving data from storage unit 171. However, these delays can be reduced by using data sequence numbers to tag data units.

Figure 5:
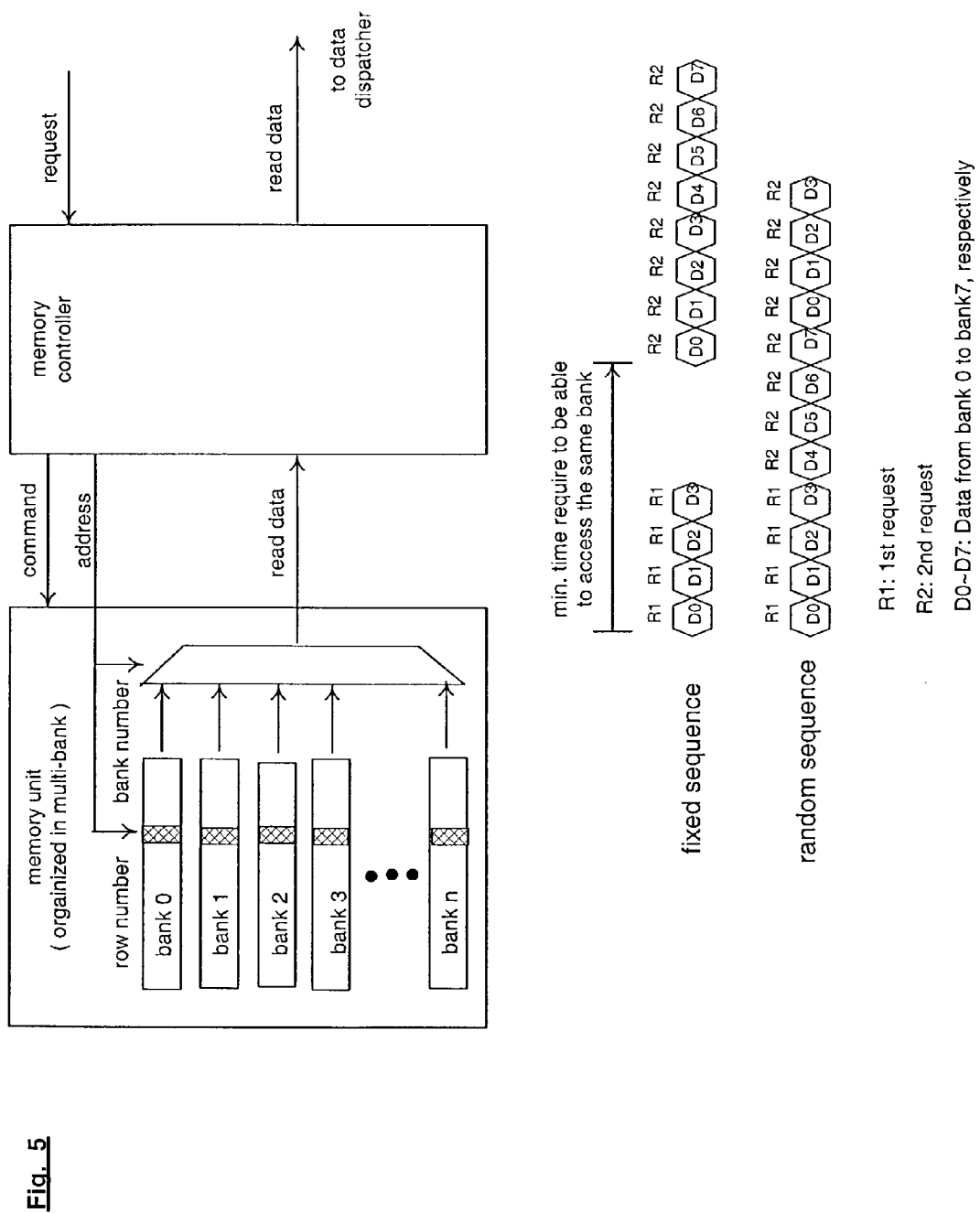
FIG. 5 shows a portion of the embodiment depicted in FIG. 4.

For example, with reference to FIG. 5, assume that storage unit 171 is a memory unit organized in multiple banks, such as a dynamic random access memory (DRAM) with multiple banks. As depicted in FIG. 5, the memory unit can include any number of banks (i.e., banks 0 to n). For the sake of example, assume that the memory unit includes 8 banks (i.e., banks 0, 1, 2, 3, 4, 5, 6, and 7) with a constraint that after a bank is accessed, the same bank can be accessed again only after a period of time (i.e., a wait time). Thus if bank 0 is accessed, then bank 0 cannot be accessed until after the wait time.

Now assume that the banks in the memory unit are accessed in accordance with a fixed sequence, meaning that the banks are accessed in the same order for each access request. For example, as depicted in FIG. 5, assume that a first access request can be divided into 4 data units, and a second access request can be divided into 8 data units. When a fixed sequence is used to access the banks in the memory unit, banks 0, 1, 2, and 3 are accessed to retrieve the 4 data units of the first access request. Banks 0, 1, 2, and 3 are accessed again to retrieve the first 4 data units of the second access request, and banks 4, 5, 6, and 7 are accessed to retrieve the last 4 data units of the second access request. Because banks 0, 1, 2, and 3 are accessed again, the second access request cannot be processed until after the wait time, which results in a delay.

However, by tagging the data units of the first and second requests with data sequence numbers, the banks in the memory unit can be accessed in an adjustable or adaptive (i.e., a non-fixed) sequence. For example, as depicted in FIG. 5, banks 4, 5, 6, and 7 of the memory unit rather than banks 0, 1, 2, and 3 can be accessed to retrieve the first 4 data units of the second request to avoid the wait time. After retrieving and tagging the data units corresponding to the first and second requests, the data units are forwarded to the data dispatcher. With reference again to FIG. 4, the data units are then forwarded to the processors, where the data sequence tags can be used to appropriately reassemble the data units.

As depicted in FIG. 4, the distributed multi-processor out-of-order system also includes an arbiter 142 and a data dispatcher 160. The arbiter 142 receives memory access requests and orders the requests based on, for example, the priority. The arbiter 142 includes a translator 163 and the data dispatcher 160 includes a translator 166. The translator 163 and the translator 166 may modify any of the fields of the tags of the memory access requests and the data units given the global view of the system. By employing both the arbiter 142 and the data dispatcher 160, the centralized record keeping is eliminated since the tags provide the information as to the processor issuing the memory access request and the information used for reassembly. The tags minimize the record keeping performed by the arbiter 142 and the data dispatcher 160 while still supporting multiple processors, multiple memory channels, different memory latencies and out-of-order execution.

The arbiter 142 can receive simultaneous memory access requests from the processors. Based on the tags, the arbiter 142 orders the memory access requests and sends them to the controller 148. The ordering by the arbiter 142 may be by priority of the request and if two requests have the same priority, then by the arrival time of the request. The memory access requests are sent from the arbiter 142 to a controller 148 using a read request bus.

The controller 148 fetches data from the storage unit 171 from the addresses specified by the memory access requests. The controller 148 schedules these accesses to the storage unit 171 by the requests. The controller 148, due to the higher priority of a second memory access request, may schedule the second memory access request earlier than a first memory access request even though the first memory access request was issued earlier. In this case, the controller 148 allows for out-of-order execution of the memory access requests.

For example, in FIG. 4, the memory access request at A0 was issued before the memory access request at A1 but because of its higher priority, the memory access request at A1 is scheduled by the controller 148 to access the storage unit earlier than the memory access request at A0. Controller 148 can include a read/write arbiter that can arbitrate between read access requests and write access requests based on the priorities associated with the read/write access requests.

A tag marking unit 154 within the controller 148 removes the tags from the memory access requests and temporarily stores them so that the corresponding data fetched at the address provided by the memory access request can be tagged. Some or all of the fields of the memory access request are used to tag the corresponding data. If a memory access request results in multiple data units then the tag marking unit 154 sets the data sequence numbers within the tags of these data units so that the data units satisfying the single request can be reassembled. The tags are attached to the corresponding data to produce the data unit. The controller 148 sends the data units to the data dispatcher 160 using a read data bus. The data dispatcher 160 includes a translator 166 that may modify one or more tags of the data unit based on a global view of the system. The translator 166 may be used to convert the tag to a processor tag type. The processor tag type identifies the processor that issued the request to fetch this data unit. The data dispatcher 160, using the tags (e.g., the processor ID) sends the data unit to the corresponding processor that issued the memory access request. The corresponding processor, using the tag (e.g., the processor access sequence number), can reassemble the data units if out-of-order execution of the requests occurred.

Figure 6:
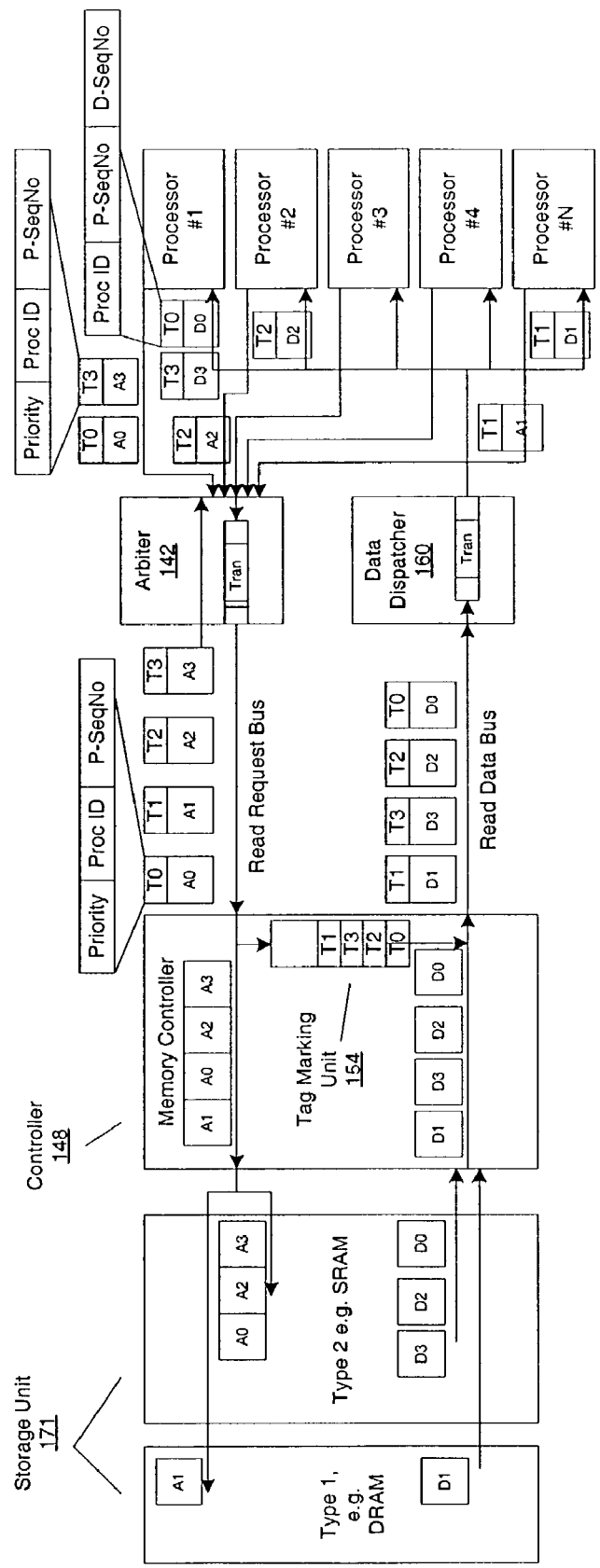
FIG. 6 shows a second embodiment of a distributed multi-processor out-of-order system according to the present invention.

FIG. 6 shows a second embodiment of a distributed multi-processor out-of-order system according to the present invention. In this embodiment, the storage unit 171 includes two different memory types, e.g., a memory type one that is a relatively slow memory such as dynamic random access memory ("DRAM") and a memory type two that is a relatively fast memory such as static random access memory ("SRAM"). As FIG. 6 shows, the address A1 is located in the slower memory type 1 and thus the memory access latency to access the data at address A1 is greater than the memory access latency to access the data at addresses A0, A2, and A3. The controller 148 knows when the data corresponding to the different requests arrives from the storage unit (e.g., given the address, the controller 148 knows the latency to fetch the data from that address) and retags the data with, for example, the processor ID, the processor access sequence number, and the data sequence number so that the data unit can properly return to the corresponding processor that requested the memory access. In FIG. 6, the data fetched from the memory type two, e.g., the D0, the D2, and the D3 arrive at the controller 148 at an earlier time than the data fetched from the memory type one, e.g., D1. Even though the data arrives in a different order at the controller 148 than was issued by the controller 148, the controller 148 keeps track of the request to which the data belongs and tags the data with the appropriate tag information to produce the data unit. Because the controller 148 associates the retrieved data with the corresponding request, the controller 148 by providing the correct tag to the retrieved data supports data retrieval from a storage unit that has different type of memory types which provide different memory latencies. For example, in FIG. 6, the tag marking unit 154 tags the data D0 with the tag T0, tags the data D2 with the tag T2, tags the data D3 with the tag T3, and tags the last arriving data D1 with the tag T1. The data dispatcher 160 uses the tags (e.g., the processor ID) to send the data units to the corresponding processor that requested the data unit. Using the tags, the distributed multi-processor out-of-order system supports fetching data from a storage unit that has different memory types without the use of a complicated and space consuming centralized management system.

Figure 7:
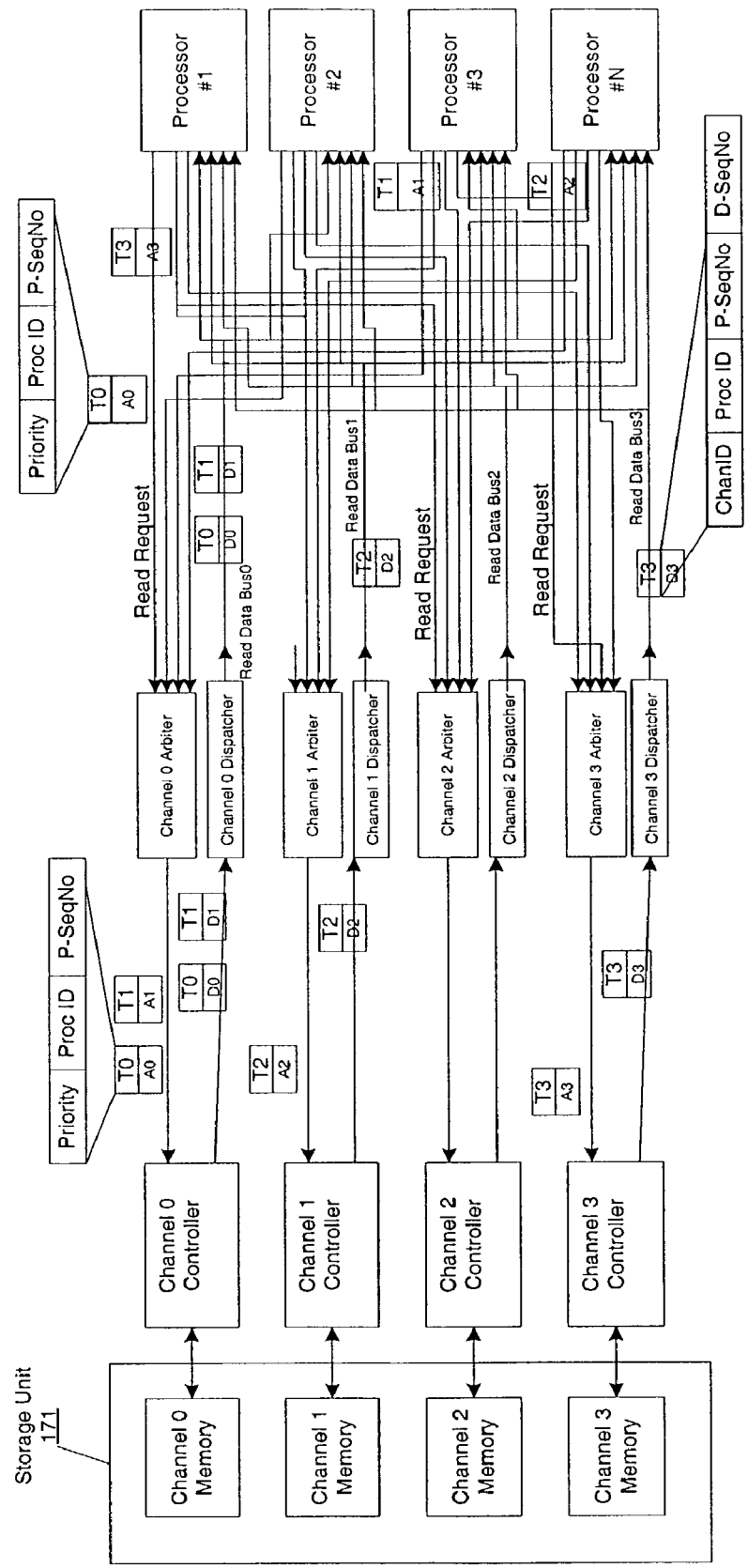
FIG. 7 shows a third embodiment of a distributed multi-processor out-of-order system according to the present invention.
Figure 7:
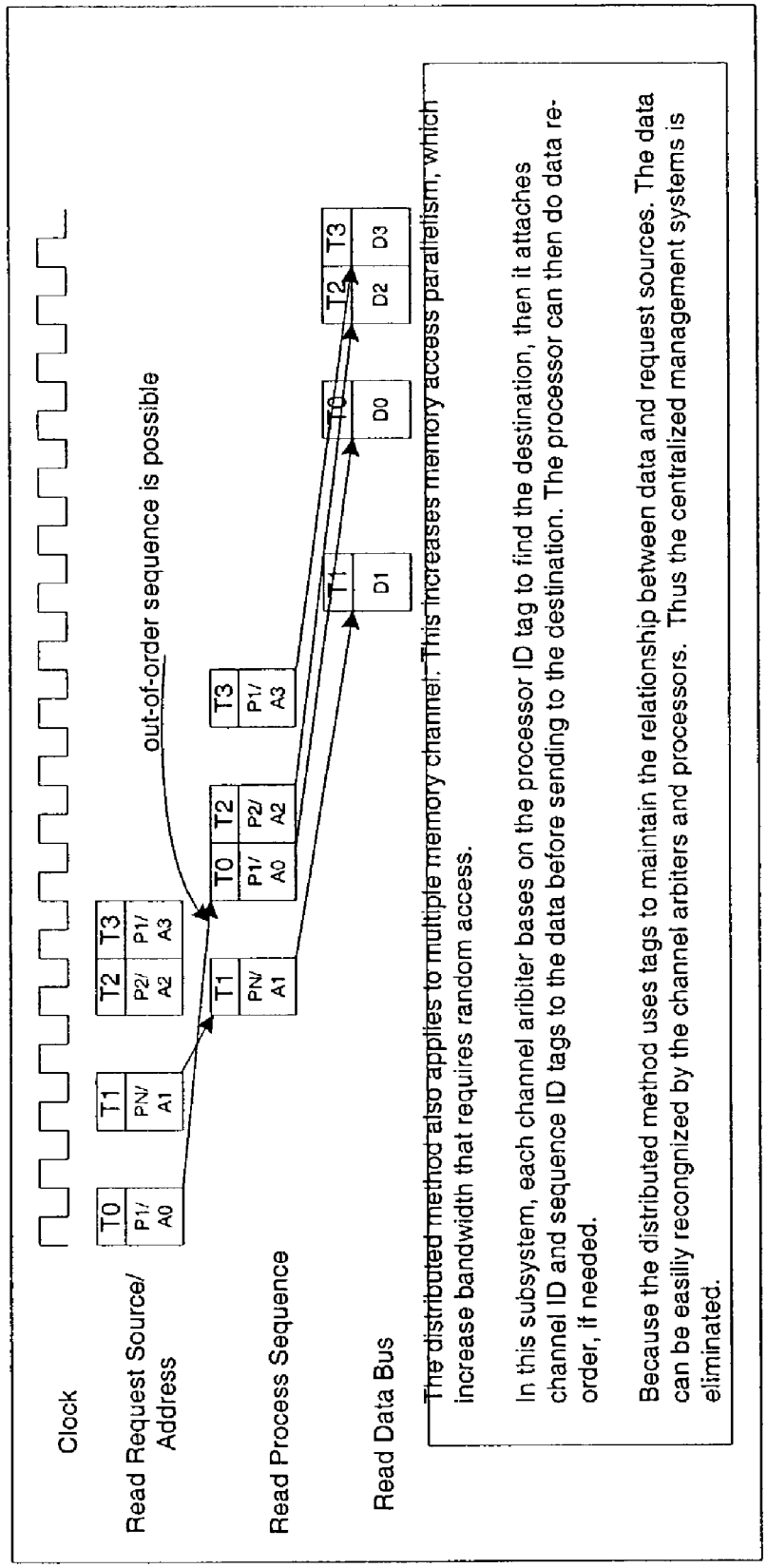

FIG. 7 shows a third embodiment of a distributed multi-processor out-of-order system according to the present invention. In this embodiment, the storage unit 171 includes a channel 0, a channel 1, a channel 2, and a channel 3. By using multiple memory channels, memory access parallelism is increased (e.g., with multiple channels, more simultaneous accesses to memory can occur than if only one channel was used) which increases the bandwidth. Each of the memory channels has a corresponding channel controller, e.g., channel 0 has a channel 0 controller, channel 1 has a channel 1 controller, channel 2 has a channel 2 controller, and channel 3 has a channel 3 controller. Each of the channel controllers adds a tag to the data retrieved from the corresponding memory channel to produce a data unit. The tag added to the data corresponds to the tag of the memory access request that specified the address from which the data was retrieved. The tag added to the data includes the processor ID and the data sequence number. The data unit is then sent to a data dispatcher corresponding to the channel (e.g., channel 0 dispatcher corresponds to channel 0, channel 1 dispatcher corresponds to channel 1, channel 2 dispatcher corresponds to channel 2, and channel 3 dispatcher corresponds to channel 3). The data dispatcher adds a channel identification number ("channel ID") and the processor access sequence number. The channel ID and the processor access sequence number together allow the processor that issued the memory access request to reassemble the data. By using the tags, the multi-processor out-of-order system supports a multiple channel storage unit without the use of a large size and slow centralized management system.

Figure 8:
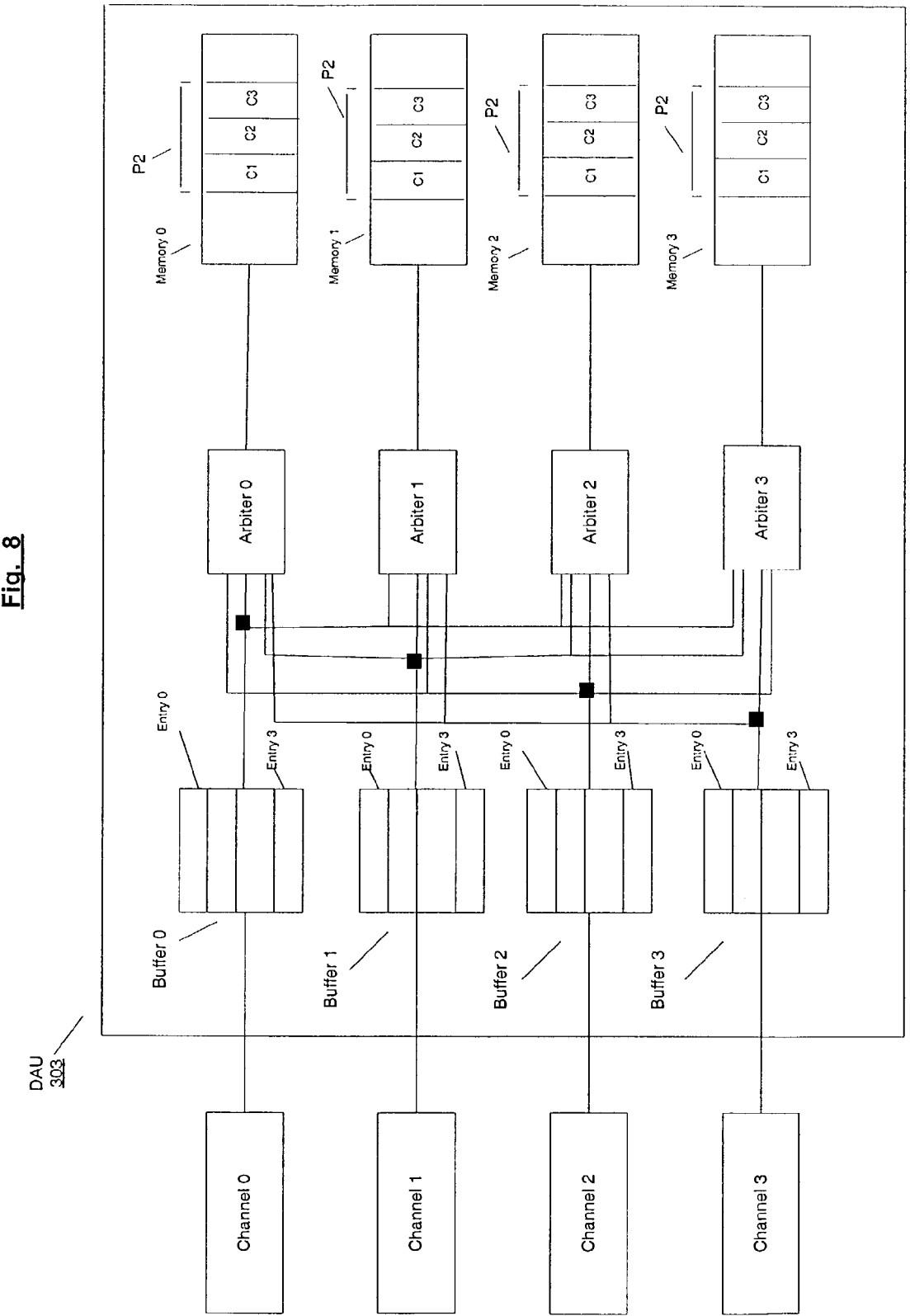
FIG. 8 shows an example of an embodiment of a data access unit according to the present invention.

FIG. 8 shows an example of an embodiment of a data access unit ("DAU") 303 according to the present invention. The DAU 303 accepts data from the channels 0 to 3 without blocking (e.g., asking the sender of the data not to send the data) or discarding the data. The DAU 303 includes channels 0-3 that provide data (e.g., the data may be the result of a read request). The data from the channels are sent to the corresponding one of the buffers 0-3 of the DAU 303. Each of the buffers includes one or more entries. Each of the one or more entries may be a register to store data. The number of entries in each of the buffers 0-3 is greater than or equal to the number of data source units (e.g., channel memory controllers) that can send data simultaneously to a particular one of the buffers 0-3. In this example, the four channels 0-3 and their corresponding data channel controllers can simultaneously send data to the four buffers 0-3 and thus there are four entries in each of the four buffers 0-3. In general, if there are "N" data source units that can simultaneously send data, then there are at least N entries in each of the buffers. Each of the buffers 0-3 are coupled to arbiters 0-3. Each of the arbiters 0-3 acts as a multiplexer selecting data from one of the buffers 0-3 to be sent to the corresponding one of the memories 0-3. Each of the arbiters 0-3 also uses the processor access sequence number and the process ID within the tag of the data to determine where in the corresponding one of the memories 0-3 to store the data.

Each of the memories 0-3 stores a portion of the data requested by one of the multithreaded processors (e.g., the "ubr processors" and the "pkt processors" shown in FIG. 3). For example, the "pkt processor 2" stores the requested data in some portion of memories 0-3. In this example, the "pkt processor 2" is assigned the "C1", the "C2", and the "C3" entries in each of the memories 0-3. As described earlier, the requested data fetched from the storage unit 171 has tags and each of these tags includes the "proc ID", the "P-SeqNo", and the "D-SeqNo". The "proc ID" instruct the arbiters 0-3 as to the memory portion within the memories 0-3 that is assigned to that processor and thus the requested data is stored there. The "P-SeqNo" instructs the arbiters 0-3 as to the one of the entries "C1", "C2", or "C3" assigned to the "proc ID" where the data should be stored. The "D-SeqNo" instructs the arbiters 0-3 as to which one of the memories 0-3 in which the requested data should be stored. For example, if the "procID" specifies the "pkt processor 2", the "P-SeqNo" specifies one of the entries "C1", and the "D-SeqNo" specifies memory 0, then the requested data having this tag is stored in memory 0, in entry "C1" assigned to P2. By having the tags and the arbiters store portions of the requested data in the memories 0-3, the requested data is parallelized. For example, 16-bytes of the requested data is stored in entry "C1" of memory 0, 16-bytes of the requested data is stored in entry "C1" of memory 1, 16-bytes of the requested data is stored in entry "C1" of memory 2, and 16-bytes of the requested data is stored in entry "C1" of memory 3. The "C1" entries in the memories 0-3 are combined to form a 64-byte requested data and this requested data may be forwarded to the APU 714 which may be a 64-byte wide single-instruction, multiple-data pipelined processor.

As an example of this embodiment of the DAU 303 and how blocking is prevented, in a worst-case situation, assume that at clock cycle 1, the channels 0-3 and the corresponding channel controllers all simultaneously send data destined for memory 0. These data are stored in entry 0 of each of the buffers 0-3. The arbiter 0 processes the data stored in the entry 0 of the buffer 0 so this entry in buffer 0 is unoccupied. However, in clock cycle 1, the arbiter 0 does not process the data stored in buffers 1, 2, and 3. At clock cycle 2, the channels 0-3 all simultaneously send data to memory 1. These data are stored in entry 1 of each of the buffers 0-3. The arbiter 1 processes the data stored in the entry 1 of the buffer 0 and the arbiter 0 processes the data stored in entry 0 of buffer 1. None of the other data stored in the other entries are processed at clock cycle 2. At clock cycle 3, the channels 0-3 all simultaneously send data to memory 2. These data are stored in entry 2 of each of the buffers 0-3. The arbiter 2 processes the data stored in the entry 2 of the buffer 0, the arbiter 1 processes the data stored in entry 1 of buffer 1 and the arbiter 0 processes the data stored in entry 0 of buffer 2. At clock cycle 3, the data stored in the other entries are not processed. At clock cycle 4, the channels 0-3 all simultaneously send data to memory 3. These data are stored in entry 3 of each of the buffers 0-3. The arbiter 3 processes the data stored in the entry 3 of the buffer 0, the arbiter 2 processes the data stored in entry 2 of buffer 1, the arbiter 1 processes the data stored in entry 1 of buffer 2, and the arbiter 0 processes the data stored in entry 0 of buffer 3. At clock cycle 5, the channels 0-3 all simultaneously send data to memory 0. These data are stored in entry 0 of each of the buffers 0-3. The arbiter 0 processes the data stored in the entry 0 of the buffer 0, and the arbiter 3 processes the data stored in entry 3 of buffer 1, the arbiter 2 processes the data stored in entry 2 of buffer 2, and the arbiter 1 processes the data stored in entry 1 of buffer 3. This example shows that blocking is prevented even in the worst case situation where the channel controller sends data to the same memory, for example, once every four clock cycles.

Figure 9:
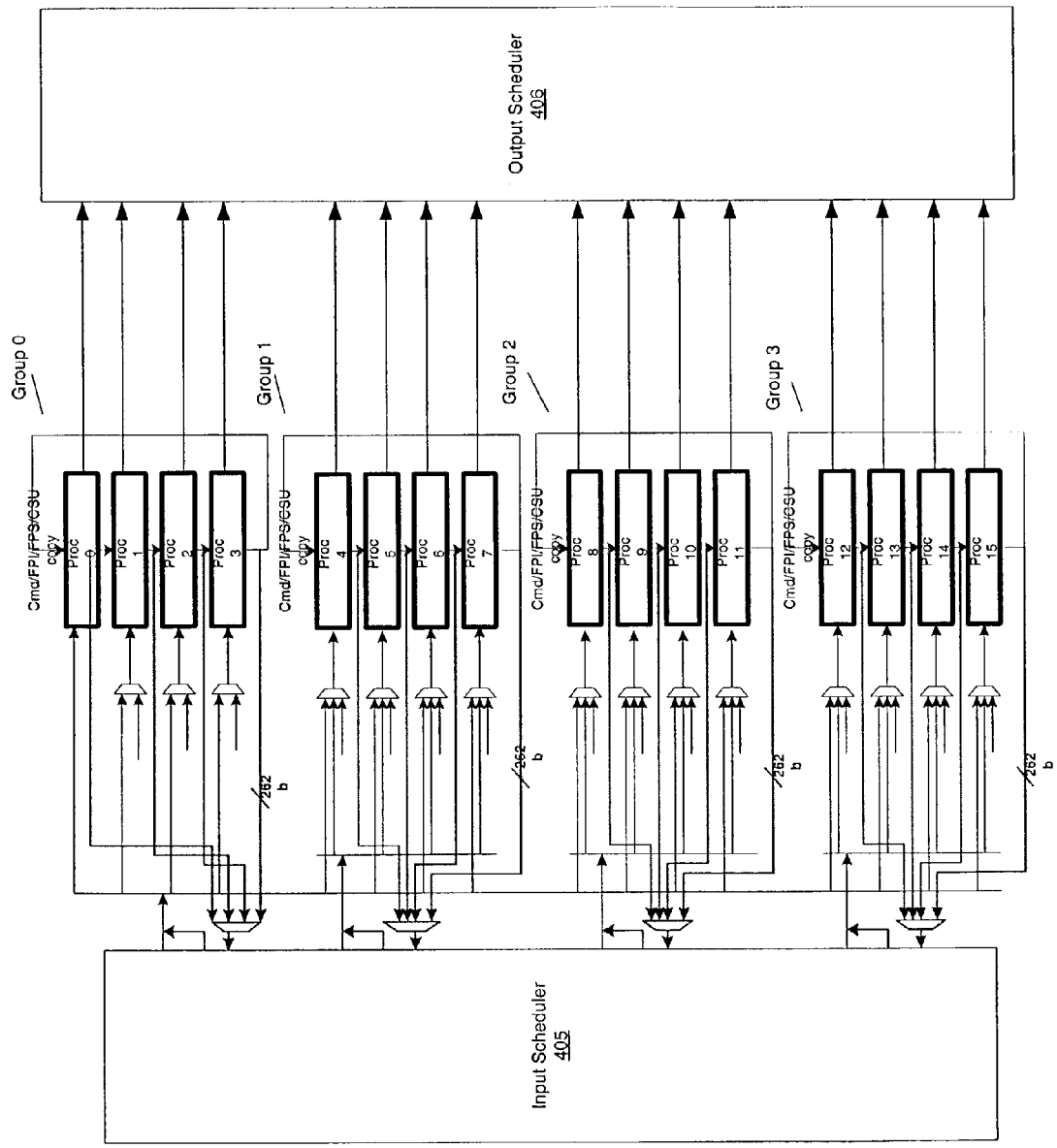
FIG. 9 shows an example of an embodiment of grouped processors according to the present invention.

FIG. 9 shows an example of an embodiment of grouped processors according to the present invention. A traffic processing unit ("TPU") provides a command that specifies an information element from a flow should be forwarded by the FPU. The flow is identified by its flow identification number ("flow-ID"). Each of the processors 0 to 15 fetches the information element from the storage unit 171. Each of the processors are assigned to a particular one of the physical output ports. The processors are grouped to limit the number of neighbor processors so that the cost of sharing states and link information is cheaper in terms of for example, the time to access memory. Within the same group, there are wide communication channels for group member processors to communicate with each other. The communication channels allow the leading processors to transmit the flow's forward processing instruction ("FPI"), forward processing state ("FPS"), and channel state table ("CST") information to the trailing processor so that the trailing processor can execute its command without having to access external memory. This allows multiple processors to forward different information elements of the same flow in parallel. This parallelism allows the handling of flows that are either bursty (e.g., variable bit rate ("VBR")) or use high bandwidth (e.g., demand a sustained rate of 2.5 Gbps).

The input scheduler 405 keeps track of which processor is executing a command belonging to a particular one of the flows. Upon receiving the command, the input scheduler 405 determines if any of the processors are processing a command belonging to the same flow as the recently received command. If one of the processors is processing a command of the same flow, then the recently arriving command is sent to a processor in the same group for processing. If none of the processors are processing a command belonging to the same flow, then the recently arriving command is sent to any of the groups that is ready to receive a command. When determining which processor within a group will output its result to an output scheduler 406, then, for example, a first-in-first-out policy is used. When selecting one of the groups for sending a processor's results to the output scheduler 406, a first-ready-first-out policy can be used. With this policy, whichever one of the groups leading data is ready will be output to the output scheduler 406 first regardless whether it arrived later than other group's leading command. For example, assume that in packet store-and-forward mode, group 0's leading command having flow-ID "X" arrives later than group 4's command having flow-ID "Y". If the data of X is ready first, then group 0's X can go to the output scheduler 406 earlier than group 4's Y.

In this embodiment, within the same group, the execution sequence may be circular. The execution sequence is the order that the commands are executed by the processors. For example, for group 0, processor 0 executes a first command, then processor 1 executes a second command, then processor 2 executes a third command, then processor 3 executes a fourth command, and then moving in a circular direction, processor 0 executes the fifth command. Both the input sequence and output forwarding sequence are the same as execution sequence. The input sequence is the sequence of arrival of the commands at the input scheduler 405. The output sequence is the sequence that commands are output by the output scheduler 406.

If the network processor is configured for the store-and-forward mode (e.g., a whole packet is forwarded, the input scheduler 405 schedules the commands to the processors carefully to prevent interleaving among the packets to the same physical port. To prevent this, the scheduler cannot commit the next new command to the same group until the trailing processor indicates that EOP is reached. The following 3 steps show this:

(1) the input scheduler 405 assigns a command to the first free processor in the group to forward packet one from the flow. Then it waits for the processor to report whether the first buffer is a EOP buffer.

(2) If the processor indicates the current buffer is a EOP buffer, then the input scheduler 405 is free to assign the next command to the next processor and the scheduler returns to step 1, otherwise, proceed to step 3.

(3) If the processor indicates it is not EOP buffer, the next processor is locked for the current command. The current processor "N" will instruct the next processor "N+1" to process the next buffer of the same flow. The input scheduler 405 wait for the processor "N+1" to report its finding. This continue until the input scheduler 405 finds the EOP buffer at which point the input scheduler 405 returns to step 1.

Figure 10:
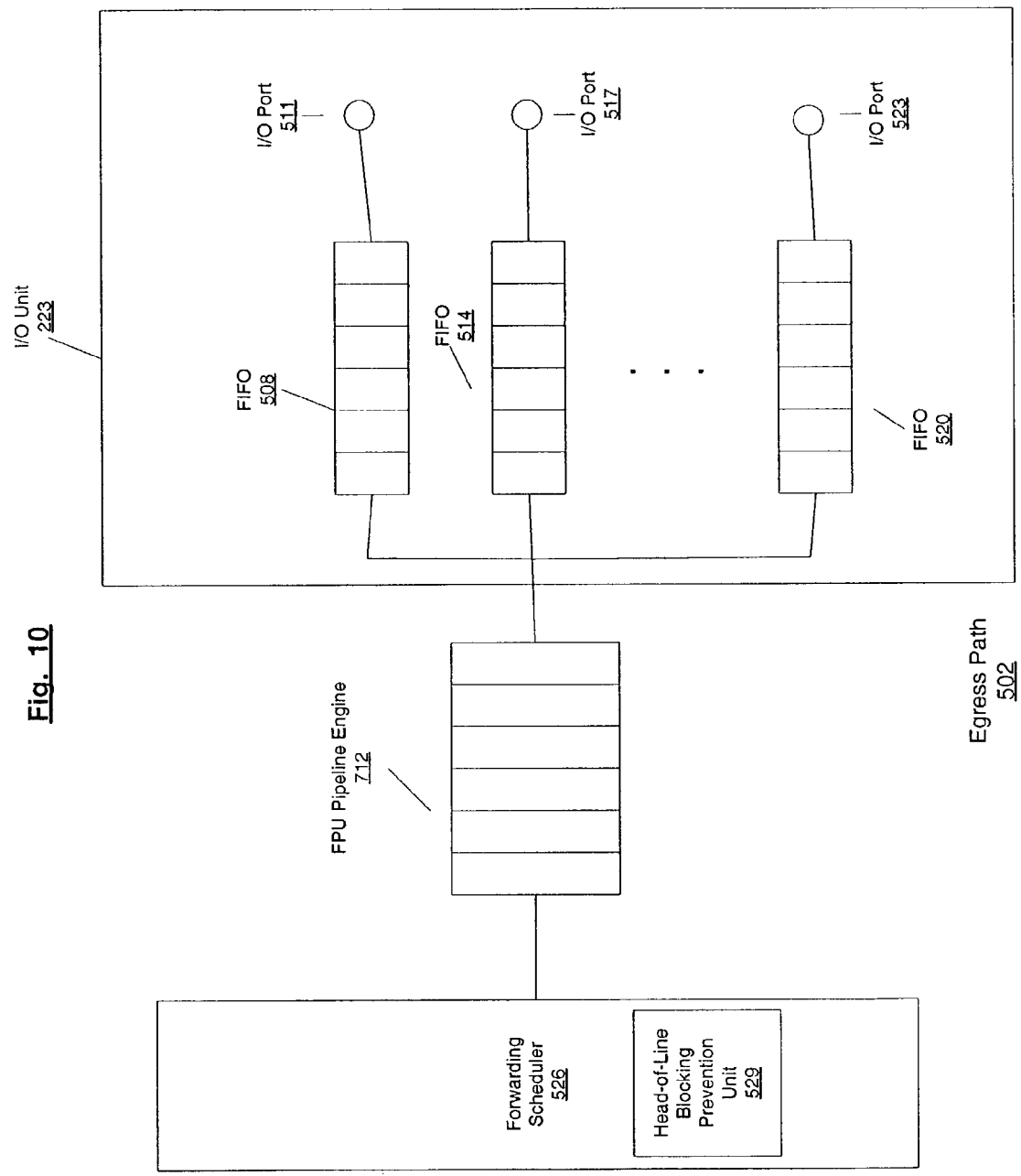
FIG. 10 shows an embodiment of an egress path according to the present invention.

FIG. 10 shows an embodiment of an egress path 502 according to the present invention. A forwarding scheduler 526 selects forwarding information from one of the forwarding processors to send to a FPU pipeline engine 712. Before sending the forwarding information to the FPU pipeline engine 712, a HOL blocking prevention unit 529 determines if there is adequate space in a data queue, such as a first-in-first-out ("FIFO"), of the physical input/output ("I/O") port to which the forwarding information is destined. The I/O unit 223 includes the FIFOs 508-520 and the I/O ports 511-523. If there is not adequate space in the FIFO to which this forwarding information is destined, then the forwarding information is not sent to the FPU pipeline engine 712. The forwarding information includes the contents of the information segment storage unit that is to be forwarded, a forward processing instruction ("FPI"), and a forwarding command that includes the physical output port where this information segment storage unit is to be output and also the flow-ID. The FPU pipeline engine 712 includes an APU pipe and a switch fabric control ("SFC") pipe. The APU pipe performs the protocol translation that converts, for example, packets to cells. The SFC pipe performs tagging so a switch fabric knows where to send the data. The SFC pipe reports its FIFO usage count (i.e., the "sfc_entry_cnt" in the equation below) to the HOL blocking prevention unit to prevent physical output port blocking. The I/O unit 223 includes one or more physical input/output ("I/O") ports and the corresponding one or more FIFOs. The I/O unit 223 provides the free entry count (i.e., the "IOU_free_entry_cnt" in the equation below) of each of the FIFOs in the I/O unit 223. The FPU pipeline engine 712 sends the modified forwarding data (e.g., packet or cell) to a first-in-first-out ("FIFO") of the I/O port at which the modified forwarding data is to be output. Each of the physical I/O ports has a dedicated FIFO. In FIG. 10, the FIFO 508 is assigned to the I/O port 511, the FIFO 514 is assigned to the I/O port 517, and the FIFO 520 is assigned to the I/O port 523.

At each clock cycle, the HOL blocking prevention unit 529 calculates the availability of the FIFO of each of the physical ports. This calculation occurs using the committed data count (i.e., the number of entries in the FPU pipeline engine 712) and the available space in a particular one of the FIFOs. When the committed data count reaches the limit in free entry space for a particular one of the FIFOs, the forwarding scheduler 526 won't select for sending to the FPU pipeline engine 712 forwarding information destined for the particular one of the FIFOs. When using the HOL blocking prevention unit 529, any forwarding information sent to the FPU pipeline engine 712 is guaranteed to have enough space for it in the FIFO to which it is destined.

The equations used to determine whether forwarding information should be sent to the FPU pipeline engine 712 are:

$$total\_pipe\_entry\_count = (apu\_pipe\_valid\_cnt * 5 + sfc\_entry\_cnt + 10);$$

$$fifo\_full = (IOU\_free\_entry\_cnt <= total\_pipe\_entry\_cnt);$$

For the first equation, the "total_pipe_entry_count" is the entries currently occupying the FPU pipeline engine 712. The "apu_pipe_valid_cnt" is the number of entries in the APU pipe. Each entry in the APU pipe occupies five entries in the FIFO so the "apu_pipe_valid_cnt" is multiplied by five. The number of occupied entries in the SFC pipe is also added in calculating the "total_pipe_entry_count". Finally, ten is added to account for each information segment storage unit using up to eight FIFO entries and other two entries are used to account for information exchange/calculation delay between the forwarding scheduler 526 and the SFC pipe. If the number of available entries in a particular one of the FIFOs (i.e., the "IOU_free_entry_cnt") is less than the "total_pipe_entry_count", then the forwarding information destined for the particular one of the FIFOs is not sent to the FPU pipeline engine 712.

Figure 11:
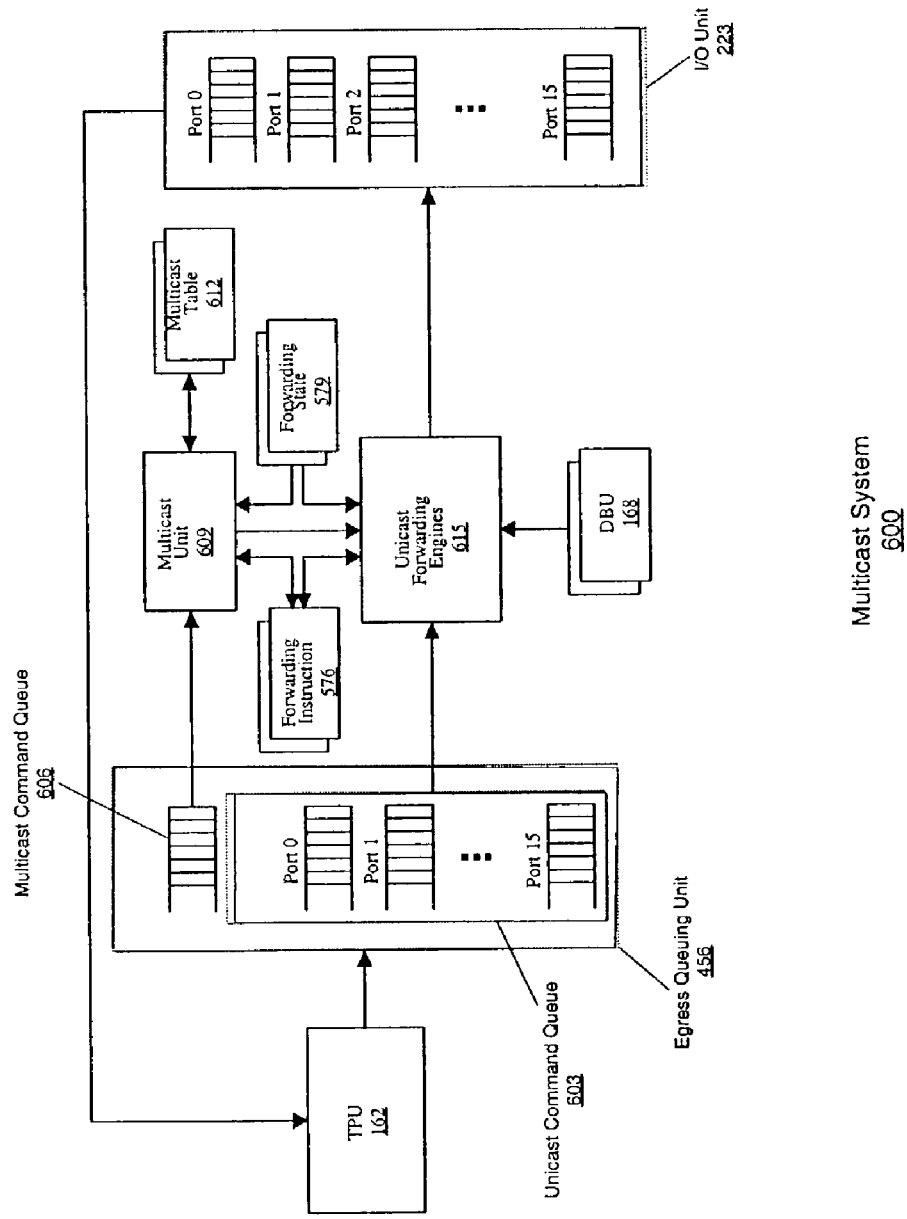
FIG. 11 shows an embodiment of a multicast system 600 according to the present invention.

The network processor supports both cell and packet multicast. Multicasting is the forwarding mechanism that forwards the flow to a group of subscribers without having to schedule the multicast flow for each of the subscribers to which the flow is to be sent. The flow refers to a flow of information elements or a virtual channel, or any similar stream of information. FIG. 11 shows an embodiment of a multicast system 600 according to the present invention. A TPU 162, using a traffic processing instruction ("TPI") that is set by an external processor, schedules a multicast flow by sending a multicast packet ready queue command ("PRQ command") to an egress queuing unit 456. The multicast PRQ command is sent to a multicast command queue 606. A multicast unit 609 (the multicast unit 609 corresponds to the "multicast command parser" of FIG. 3) fetches the multicast PRQ command from the multicast command queue 606. Using the multicast PRQ command, the multicast unit 609 fetches a forward processing instruction ("FPI") 578 to determine the location of a multicast table 612. The multicast table 612 is located within the storage unit 171 and this is accessed using a data buffer unit ("DBU") 168. The multicast unit 609 then checks the multicast table 612 to determine which subscribers are to be included in the broadcast. The multicast table 612 includes a multicast page with a list of subscribers. If the number of subscribers exceeds a size limit of the multicast page, another page can be added to the multicast table 612 to include another list of subscribers. A pointer in the first multicast page links the two pages of the multicast table 612 together. The multicast table 612 also specifies the flow-ID for each subscriber and the logical output port that the particular one of the flows should be sent. Using the information provided by the multicast table 612, the multicast unit 609 updates the FPS 579 of each of the subscribers that are to receive the broadcast. The FPS 579 of each of the subscribers is updated so that it has the same payload buffer queue information as the multicast flow represented by the multicast PRQ command (e.g., a "current buffer pointer" field and a "current channel processor access sequence number" field of each of the FPSs of each broadcast subscriber is the same as the "current buffer pointer" field and the "current channel processor access sequence number" field of the multicast flow). The multicast unit 609 then issues forwarding commands for each of the subscribers to the unicast forwarding engine 615 so that the multicast flow is sent to each of these subscribers (the unicast forwarding engine 615 corresponds to the "pkt processors" in FIG. 3). For each of the subscribers, the unicast forwarding engine 615 then fetches, using the DBU 168, a portion or all of the information element of the multicast flow.

Cell Mode (Cell-to-Cell and Packet-to-Cell)

Figures 12, 13:
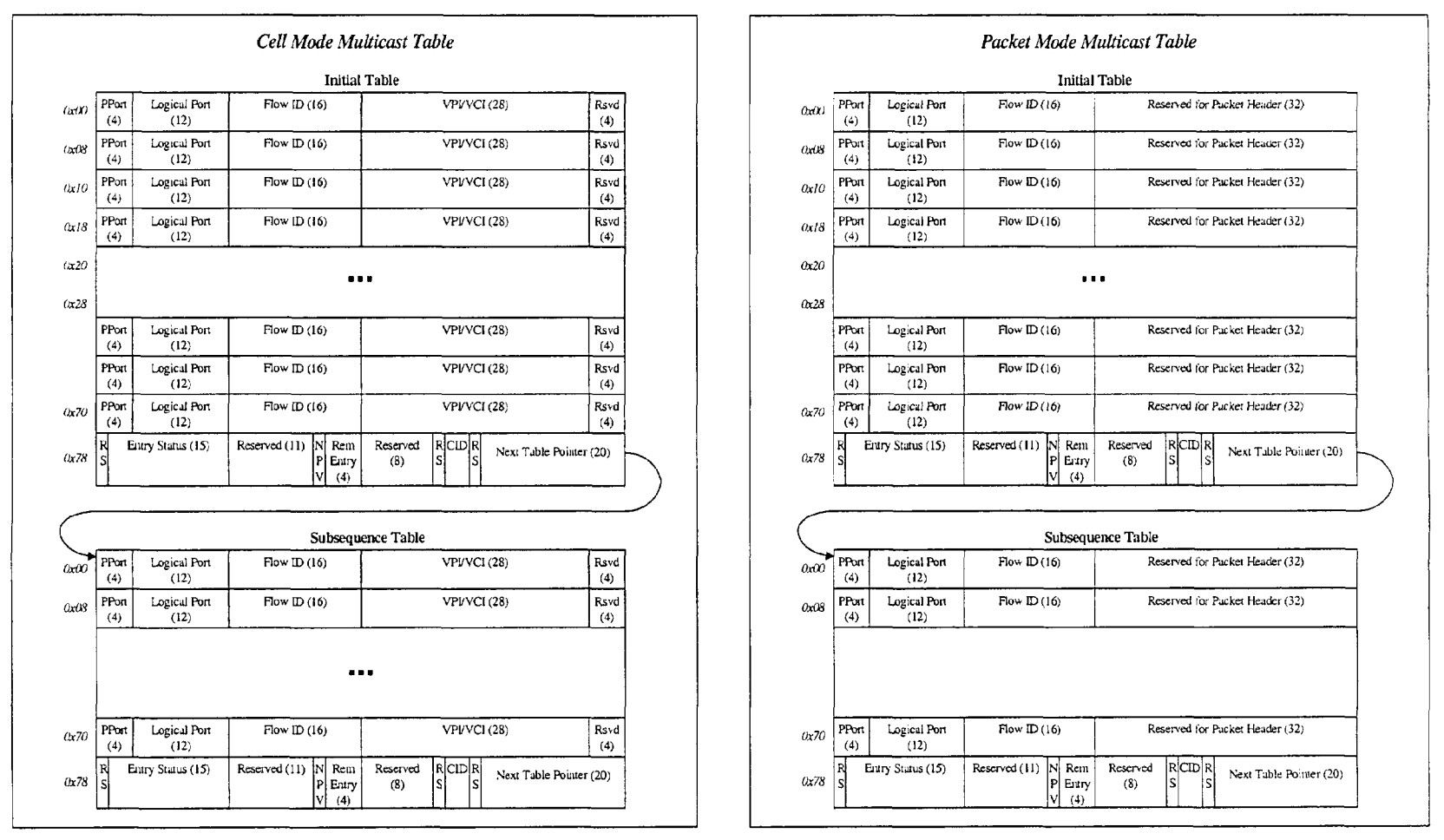

In cell mode, the network processor supports multicast for CBR, VBR, and UBR traffic that goes through the TPU scheduler. FIG. 12 depicts an exemplary table format for cell mode multicast.

Packet Mode (C-P & P-P)

In the packet mode, the network processor supports multicast for packet traffic. FIG. 13 depicts an exemplary table format for the packet mode.

CSIX Mode Multicast

The network processor supports the CSIX-L1 interface specification for the switch fabric backplane interface. The CSIX standard supports various multicast schemes. All of the multicast schemes defined within the CSIX specifications are transparent to the FPU and can be supported by manipulating the multicast table accordingly. The FPU can be configured to operate in CSIX mode and the multicast table will be interpreted accordingly.

Figures 14, 15, 16:
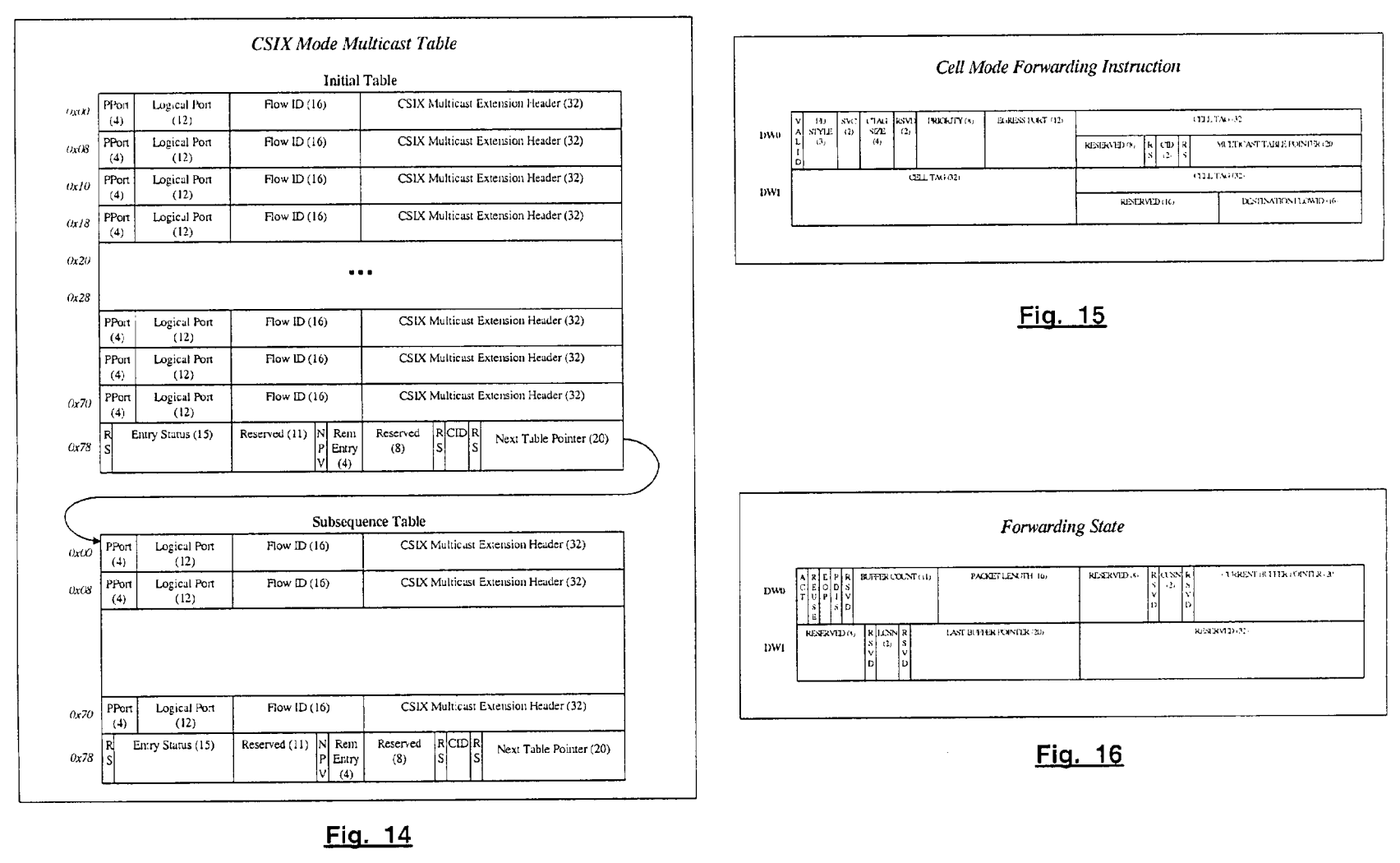

The multicast table structure for CSIX mode is similar to the multicast table for cell mode. The difference is in the VPI/VCI field. Instead of the VPI/VCI, each entry contains the CSIX multicast extension header for the FPU to use as the CSIX multicast extension header. FIG. 14 depicts an exemplary multicast table format for CSIX mode.

Forwarding Instruction

The Forwarding Instruction is a per-flow instruction for the Forwarding Processing Unit. Various execution units with the FPU are enabled or disabled base on this instruction. Upper layer stack initializes all fields within the instruction when the flow is created. The InP internal hardware does not modify or alter any of these fields.

Cell Mode (C-C & P-C)

FIG. 15 depicts an exemplary forwarding instruction for cell mode. The fields within the exemplary forwardin instruction are described below.

The "VALID" field (i.e., the Valid field) in the cell mode forwarding instruction is a bit that validates the Forwarding Processing Instruction (FPI). The upper layer stack initializes this bit when the flow is created, and alters it throughout the device's operation. This bit is set after the flow is created and the various fields within the FPI are properly initialized. This bit is cleared when the flow is closed. When the flow is closed and data is still linked to it, the FPU will return the buffer when the cell is scheduled. When all the data is sent, the FPU will set the Reuse bit in the Forwarding Processing State (FPS) to indicate to the upper layer stack that the instruction and state for this FlowID can be reused.

The "FD STYLE (3)" field (i.e., the Forwarding Style field) contains the encoded information about how the packets/cells are forwarded for each command from the TPU. This field is decoded as follows:

| | |
|---|---|
| 000 | Forward the entire packet. |
| 001 | Forward a buffer of the packet. |
| 010 | Forward the entire AAL5 PDU. |
| 011 | Forward a cell of the AAL5 PDU. |
| 100 | Reserved. |
| 101 | Reserved. |
| 110 | Reserved. |
| 111 | Reserved. |

The "SVC (2)" field (i.e., the Service Category field) contains the service category of the flow. It is deoded as follows:

| | |
|---|---|
| 00 | CBR. |
| 01 | VBR. |
| 10 | Reserved. |
| 11 | UBR. |

The "CTAG SIZE (4)" filed (i.e., the Cell Tag Size field) specifies the number of bytes to tag onto the Cell Tag field. The maximum Cell Tag size is 12 bytes.

The "RSVD (2)" field (i.e., the Reserved field) is reserved.

The "PRIORITY (8)" field (i.e., the Priority field) valid for UBR flows only (TPU not involved). For UBR traffic, this field contains the priority of the flow. The priority is required when the egress is connected to a switch fabric because the switch fabric's header contain the priority. For types of traffic other than UBR, this information is passed from the TPU.

The "ENGRESS PORT (12)" field (i.e., the Egress Port field) valid for UBR traffic only (TPU not involved). For UBR traffic, this field identifies the logical egress port for this flow. For other types of traffic, this information is passed from the TPU.

The "RESERVED (8)" field (i.e., the Reserved field) is a reserved field

The "RS (1)" field (i.e., the Reserved field) is a reserved field.

The "CID (2)" field (i.e., the Multicast Table Channel ID field) valid for Multicast flow only. This field contains the Channel ID of the pointer to the Multicast Table.

The "RS (1)" field (i.e., the Reserved field) is a reserved field.

The "MULTICAST TABLE POINTER (20)" field (i.e., the Multicast Table Pointer field) valid for Multicast flow only. This field contains the pointer to a Multicast Table if the flow is a multicast flow. The Multicast Table contains the list of ATM Headers and Egress Ports for cell mode and the FPI for the packet mode.

The "CELL TAG (32)" field (i.e., the Cell Tag field) contains the last 4 bytes of data that can be used to tag the cell. The bytes are defined as follows:

| | |
|---|---|
| [31:24] | Cell Tag Byte 11. |
| [23:16] | Cell Tag Byte 10. |
| [15:8] | Cell Tag Byte 9. |
| [7:0] | Cell Tag Byte 8. |

The "CELL TAG (64)" field (i.e., the Cell Tag field) contains the first 8 bytes of the data that can be used to tag the cell. The bytes are defined as follows:

| | |
|---|---|
| [63:56] | Cell Tag Byte 7. |
| [55:48] | Cell Tag Byte 6. |
| [47:40] | Cell Tag Byte 5. |
| [39:32] | Cell Tag Byte 4. |
| [31:24] | Cell Tag Byte 3. |
| [23:16] | Cell Tag Byte 2. |
| [15:7] | Cell Tag Byte 1. |
| [7:0] | Cell Tag Byte 0. |

The "DESTINATION FLOW ID (16)" field (i.e., the Destination FlowID field) contains the FlowID for the Destination Port's InP when using a CSIX switch fabric as the backplane. This field is tagged within the CSIX CFrame for the Egress InP to do reassembly.

Forwarding State

The Forward State is a per-flow state for the Forwarding Processing Unit. This state table is the same for both the cell and packet modes. The FPU uses this to keep the current state of the flow in order to process multiple active flows simultaneously. Upper layer stack initializes all fields within the state when the flow is created and does not alter them afterwards. The FPU maintains and controls these fields during normal operation.

FIG. 16 depicts an exemplary forwarding state. The fields within the exemplary forwarding state are described below.

The "Current Buffer Pointer" field contains the Current Buffer Pointer. The FPU uses this along with the Current Channel ID to fetch the cell or packet buffer for forwarding.

The "Reserved" field is a reserved field.

The "Current Channel Sequence Number" field contains the Payload Buffer Channel Sequence Number of the Current Buffer Pointer. The FPU uses this along with the Current Buffer Pointer to get the Channel ID of the current buffer from the Channel Sequence Table. The FPU then uses the Channel ID along with the Current Buffer Pointer to fetch the cell or packet buffer for forwarding.

The "Reserved" field is a reserved field.

The "Packet Length" field contains the packet length of the current packet. The FPU uses this field as a temporary storage to calculate the packet length of the current packet.

The "Buffer Count" field contains the buffer count of the current packet. The FPU copies this field from the packet header when there is a packet discard to know exactly how many buffers to discard. This count is decremented each time a buffer is recycled.

The "Reserved" field is a reserved field.

The "Packet Discard" field indicates that the current packet should be discarded. The FPU copies this info from the packet header as a storage for subsequent buffers that does not contain a valid packet header. The FPU will continue to discard all the buffers until the Buffer Count reaches zero. The FPU then reset this field to zero before fetching the next packet.

The "End Of Packet (EOP)" field indicates that the previous buffer was the end of the previous packet. This bit is set when the last buffer is forwarded and cleared when the next packet's first buffer is forwarded. This is for the FPU to delineate the packet boundary to do encapsulation and tagging as needed.

The "Reuse" field indicates that the Forwarding Instruction and State tables for this flow can be reused. This is a handshake to the upper layer stack that the FPU recycles all the buffers that are link to this flow. The Forwarding Instruction and State tables can be reused when this bit is set to one.

The "Active" field indicates that this flow is active or has packet queued to it for transmitting. When the EQU link a packet to the Forwarding State to be forwarded, it sets the active bit if it is not already set. The FPU clears this bit when the last buffer is forwarded.

The "Reserved" field is a reserved field.

The "Last Buffer Pointer" field contains the Last Buffer Pointer of the flow's packet link list. The FPU uses this field along with the Last Channel ID and the Active bit to determine where is the end of the packet link. The FPU will reset the Active bit to zero indicating no more valid data to send.

The "Reserved" field is a reserved field.

The "Last Buffer Channel Sequence Number" field contains the last buffer's Channel Sequence Number. The FPU uses this along with the Last Buffer Pointer and the Active bit to determine where is the end of the packet link list.

The "Reserved" field is a reserved field.

While the present invention has been particularly described with respect to the illustrated embodiments, it will be appreciated that various alterations, modifications and adaptations may be based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the claims.

We claim:

1. A system of processing access requests to a storage unit from multiple processors, the system comprising:
   a plurality of processors;
   a plurality of channels that connect the processors to the storage unit, wherein each of the processors has access to each of the channels;
   a plurality of channel-specific controllers connected between the processors and the storage unit, wherein one channel-specific controller is associated with each different channel;
   a plurality of channel-specific arbiters connected between the channel-specific controllers and the processors, wherein one channel-specific arbiter is associated with each different channel;
   a plurality of channel-specific data dispatchers connected between the channel-specific controllers and the processors, wherein one channel-specific data dispatcher is associated with each different channel;
   wherein the processors are configured to issue access requests having a tag, wherein the tag includes, a priority, a processor identification that identifies the processor that issued the access request, and a processor access sequence number that indicates the order in which the processor issued the access requests;
   wherein the channel-specific arbiters are configured to sort access requests based on the priority indicated in the tags of the access requests before forwarding the access requests to the respective channel-specific controllers;
   wherein the channel-specific controllers are configured to retrieve from the storage unit data corresponding to the access requests issued by the processors and received from the channel-specific arbiters and to add a tag to the retrieved data from the storage unit to form a data unit, wherein the added tag includes the processor identification that identifies the processor that issued the access request corresponding to the retrieved data and a data sequence number that is used by the processor to reassemble multiple data units that satisfy a single access request;
   wherein the channel-specific data dispatchers are configured to receive the data units from the channel-specific controllers, to add a channel identification number corresponding to the channel used to retrieve the data from the storage unit and the processor access sequence number that indicates the order in which the processor issued the access request to the tag, and to send the data units to the processor that issued the access request; and
   wherein the processors reassemble the retrieved data based on the processor access sequence numbers and the data sequence numbers found in the tags.

2. The system of claim 1, wherein channel-specific controllers each include a tag marking unit that tracks the correspondence of the tags and the data retrieved based on the access requests.

3. The system of claim 1, wherein the access requests include write access requests and read access requests, and wherein the channel-specific arbiters arbitrate between write access requests and read access requests using the priority for the access requests.

* * * * *